US012585212B2

(12) United States Patent
Hosohara et al.

(10) Patent No.: US 12,585,212 B2
(45) Date of Patent: Mar. 24, 2026

(54) IMAGE FORMING APPARATUS HAVING DEVELOPING UNITS THAT CAN BE RE-SUPPLIED WITH DEVELOPER FROM RESUPPLY PACKAGES

(71) Applicant: CANON KABUSHIKI KAISHA, Tokyo (JP)

(72) Inventors: Kazuhiro Hosohara, Kanagawa (JP); Akinori Mitsumata, Tokyo (JP); Kazuaki Nogami, Kanagawa (JP); Noritomo Yamaguchi, Kanagawa (JP); Takeo Kawanami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/883,442

(22) Filed: Sep. 12, 2024

(65) Prior Publication Data

US 2025/0004397 A1 Jan. 2, 2025

Related U.S. Application Data

(63) Continuation of application No. PCT/JP2023/009349, filed on Mar. 10, 2023.

(30) Foreign Application Priority Data

Mar. 14, 2022 (JP) ................................ 2022-038779

(51) Int. Cl.
*G03G 15/08* (2006.01)
*G03G 15/01* (2006.01)
*G03G 21/16* (2006.01)

(52) U.S. Cl.
CPC ..... *G03G 15/0879* (2013.01); *G03G 15/0121* (2013.01); *G03G 15/0178* (2013.01);
(Continued)

(58) Field of Classification Search
CPC ........... G03G 15/0121; G03G 15/0189; G03G 15/0874; G03G 15/0879; G03G 21/1633;
(Continued)

(56) References Cited

U.S. PATENT DOCUMENTS 5,325,162 A * 6/1994 Kroll .................. G03G 15/0126 222/DIG. 1
5,640,644 A * 6/1997 Kimura ............. G03G 15/0855 399/262
(Continued)

FOREIGN PATENT DOCUMENTS

EP 0571767 A2 12/1993
JP 2010224172 A 10/2010
(Continued)

*Primary Examiner* — Robert B Beatty
(74) *Attorney, Agent, or Firm* — Canon U.S.A., Inc. IP Division

(57) ABSTRACT

An image forming apparatus includes: a first unit having a first container and a first roller; a second unit having a second container and a second roller; a first section to which a first container is attachable and having a first frame with a first inlet; a second section to which a second container is attachable and having a second frame with a second inlet; a first receptacle provided below the first mount section and communicating with the first inlet; a second receptacle provided below the second mount section and communicating with the second inlet; a first passage extending from the first receptacle to the first container; first means for conveying toner through the first passage; a second passage extending from the second receptacle to the second container; and second means for conveying toner through the second passage.

17 Claims, 25 Drawing Sheets

(52) U.S. Cl.
CPC ..... *G03G 15/0189* (2013.01); *G03G 15/0874* (2013.01); *G03G 21/1633* (2013.01)

(58) Field of Classification Search
CPC ... G03G 2215/0119; G03G 2215/0122; G03G 2215/0673; G03G 2215/0678; G03G 2215/0682
USPC .......................................... 399/223, 258, 262
See application file for complete search history.

(56) References Cited

U.S. PATENT DOCUMENTS

| | | | | |
|---|---|---|---|---|
| 7,970,313 | B2 * | 6/2011 | Sato | G03G 15/0872 399/119 |
| 9,389,539 | B1 * | 7/2016 | Somemiya | G03G 21/1604 |
| 2002/0009310 | A1 * | 1/2002 | Kabumoto | G03G 15/0879 399/258 |
| 2006/0239719 | A1 * | 10/2006 | Sur | G03G 15/0893 399/258 |
| 2007/0253747 | A1 * | 11/2007 | Koizumi | G03G 15/0879 399/262 |
| 2009/0162096 | A1 * | 6/2009 | Sakuma | G03G 15/0872 399/119 |
| 2013/0251396 | A1 * | 9/2013 | Shikata | G03G 21/1633 312/309 |
| 2016/0282759 | A1 | 9/2016 | Matsumoto | |

FOREIGN PATENT DOCUMENTS

| | | | |
|---|---|---|---|
| JP | 2015004779 | A | 1/2015 |
| JP | 2020154300 | A | 9/2020 |

* cited by examiner

IMAGE FORMING APPARATUS HAVING DEVELOPING UNITS THAT CAN BE RE-SUPPLIED WITH DEVELOPER FROM RESUPPLY PACKAGES

CROSS-REFERENCE TO RELATED APPLICATIONS

This application is a Continuation of International Patent Application No. PCT/JP2023/009349, filed Mar. 10, 2023, which claims the benefit of Japanese Patent Application No. 2022-038779, filed Mar. 14, 2022, both of which are hereby incorporated by reference herein in their entirety.

TECHNICAL FIELD

The present invention relates to image forming apparatuses.

BACKGROUND ART

A known electrophotographic image forming apparatus is configured to resupply toner to a developer container within the image forming apparatus by using a toner container attachable to and detachable from the image forming apparatus. Patent Literature 1 discloses a configuration that enables easy resupplying of toner without having to replace the developer container by mounting a resupply package to the image forming apparatus.

CITATION LIST

Patent Literature

PTL 1 Japanese Patent Laid-Open No. 2020-154300

SUMMARY OF INVENTION

An object of the present invention is to provide a type of an image forming apparatus.

A first aspect of the present invention provides an image forming apparatus for forming an image onto a recording medium. The image forming apparatus includes: a first developing unit having a first developer container and a first developing roller, the first developer container being configured to accommodate a first developer, the first developing roller being configured to carry the first developer; a second developing unit arranged alongside the first developing unit in a first direction and having a second developer container and a second developing roller, the second developer container being configured to accommodate a second developer, the second developing roller being configured to carry the second developer; a first mount section to and from which a first developer container accommodating the first developer is attachable and detachable, the first mount section having a first reception frame provided with a first inlet that receives the first developer from the first developer container; a second mount section to and from which a second developer container accommodating the second developer is attachable and detachable, the second mount section having a second reception frame provided with a second inlet that receives the second developer from the second developer container, the second mount section being arranged alongside the first mount section in a second direction intersecting with the first direction; a first intermediate receptacle at least partially provided below the first mount section to overlap the first mount section as viewed in a third direction intersecting with both the first direction and the second direction, the first intermediate receptacle communicating with the first inlet and being configured to accommodate the first developer; a second intermediate receptacle at least partially provided below the second mount section to overlap the second mount section as viewed in the third direction, the second intermediate receptacle communicating with the second inlet and being configured to accommodate the second developer; a first conveyance passage extending from the first intermediate receptacle to the first developer container; first conveying means for conveying the first developer from the first intermediate receptacle to the first developer container via the first conveyance passage; a second conveyance passage extending from the second intermediate receptacle to the second developer container; and second conveying means for conveying the second developer from the second intermediate receptacle to the second developer container via the second conveyance passage.

A second aspect of the present invention provides an image forming apparatus for forming an image onto a recording medium. The image forming apparatus includes: a first developing unit having a first developer container and a first developing roller, the first developer container being configured to accommodate a first developer, the first developing roller being configured to carry the first developer; a second developing unit arranged alongside the first developing unit in a first direction and having a second developer container and a second developing roller, the second developer container being configured to accommodate a second developer, the second developing roller being configured to carry the second developer; an apparatus body; a first developer container accommodating the first developer and provided at a position overlapping the first developing unit as viewed in the first direction, the first developer container being separable from the apparatus body; a second developer container accommodating the second developer and provided at a position overlapping the second developing unit as viewed in the first direction and alongside the first developer container in a second direction intersecting with the first direction, the second developer container being separable from the apparatus body; a first conveyance passage extending from the first developer container to the first developer container; a second conveyance passage extending from the second developer container to the second developer container; first conveying means for conveying the first developer toward the first developer container via the first conveyance passage; and second conveying means for conveying the second developer toward the second developer container via the second conveyance passage.

Further features of the present invention will become apparent from the following description of exemplary embodiments with reference to the attached drawings.

DESCRIPTION OF EMBODIMENTS

A configuration for implementing the invention will be exemplarily described in detail below based on embodiments with reference to the drawings. It should be noted that, for example, the dimensions, materials, shapes, and relative positions of components described in the embodiments are to be changed, where appropriate, in accordance with the configuration of an apparatus to which the invention is applied and various conditions thereof. Specifically, the scope of the invention is not to be limited to the following embodiments.

Example 1

[Image Forming Apparatus]

Figure 1:
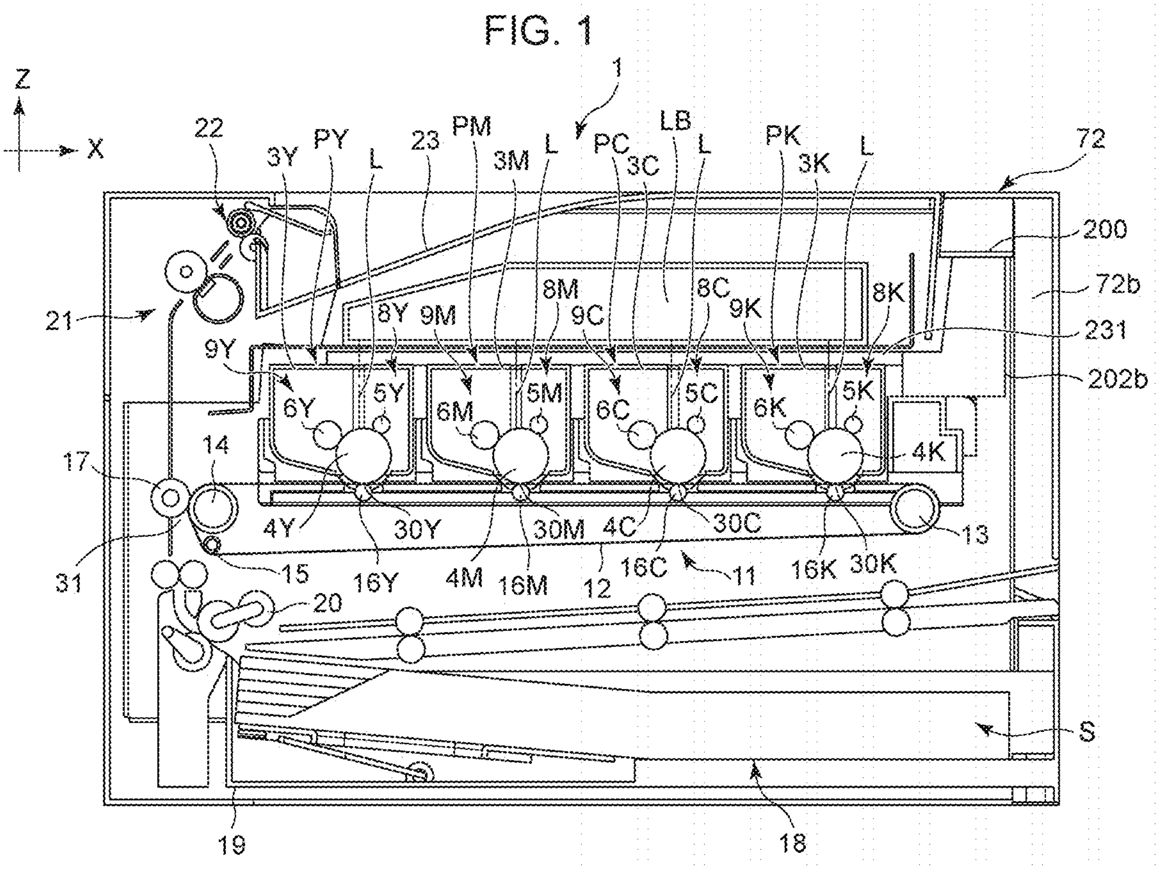
FIG. 1 is a cross-sectional view of an image forming apparatus according to Example 1.

An image forming apparatus 1 according to Example 1 of the present invention will now be described with reference to FIG. 1. An electrophotographic image forming apparatus according to this Example is a full-color image forming apparatus equipped with process cartridges for four colors. FIG. 1 is a principal sectional view of the image forming apparatus 1.

The image forming apparatus 1 is a full-color laser printer using an electrophotographic process and can form a full-color image onto a recording medium S. The image forming apparatus 1 includes process cartridges P (PY, PM, PC, PK) (referred to as "cartridges P" hereinafter) and an apparatus body 72. The cartridges P (PY, PM, PC, PK) will respectively be referred to as a first cartridge PY, a first cartridge PM, a first cartridge PC, and a first cartridge PK. The four cartridges P are arranged in a first direction X and have toners of different colors contained therein. The longitudinal direction of each cartridge P is a second direction Y orthogonal to the first direction.

The cartridge P for each color has an electrophotographic process element. The cartridge P receives a rotational driving force transmitted from a drive output unit (not shown) of the apparatus body 72 and is supplied with a bias voltage (e.g., charge bias, development bias) from a bias applying unit (not shown) of the apparatus body 72.

As shown in FIG. 1, the cartridge P for each color includes a drum unit 8 (8Y, 8M, 8C, 8K) having a photosensitive drum 4 (4Y, 4M, 4C, 4K) and a charge roller 5 (5Y, 5M, 5C, 5K) serving as processing means operating on the photosensitive drum 4. The photosensitive drum 4 is disposed such that the direction of the rotational axis of the photosensitive drum 4 is aligned with the second direction Y. The photosensitive drums 4 (4Y, 4M, 4C, 4K) will respectively be defined as a first photosensitive drum, a second photosensitive drum, a third photosensitive drum, and a fourth photosensitive drum. The drum units 8 (8Y, 8M, 8C, 8K) will respectively be defined as a first drum unit, a second drum unit, a third drum unit, and a fourth drum unit.

The cartridge P for each color includes a developing unit 9 (9Y, 9M, 9C, 9K) having a developing roller (6Y, 6M, 6C, 6K) that develops an electrostatic latent image on the photosensitive drum 4. The developing rollers (6Y, 6M, 6C, 6K) will respectively be referred to as a first developing roller, a second developing roller, a third developing roller, and a fourth developing roller. The developing units 9 (9Y, 9M, 9C, 9K) will respectively be referred to as a first developing unit, a second developing unit, a third developing unit, and a fourth developing unit.

The developing unit 9Y has a developer container 3Y (first developer container) accommodating a yellow (Y) toner (first developer) and is configured to cause the developing roller 6Y carrying the yellow (Y) toner to supply the yellow (Y) toner onto the surface of the photosensitive drum 4Y. The developing unit 9M has a developer container 3M (second developer container) accommodating a magenta (M) toner (second developer) and is configured to cause the developing roller 6M carrying the magenta (M) toner to supply the magenta (M) toner onto the surface of the photosensitive drum 4M. The developing unit 9C has a developer container 3C (third developer container) accommodating a cyan (C) toner (third toner) and is configured to cause the developing roller 6C carrying the cyan (C) toner to supply the cyan (C) toner onto the surface of the photosensitive drum 4C. The developing unit 9K has a developer container 3K (fourth developer container) accommodating a black (K) toner (fourth toner) and is configured to cause the developing roller 6K carrying the black (K) toner to supply the black (K) toner onto the surface of the photosensitive drum 4K.

In a third direction Z intersecting with both of the first direction X and the second direction Y, a laser scanner unit LB (exposure unit) is provided above the cartridges P (photosensitive drums 4). The laser scanner unit LB outputs laser light corresponding to image information. The light path of the laser light will be defined as “L” hereinafter. The laser light travels through exposure windows 10 (10Y, 10M, 10C, 10K) of the laser scanner unit LB, whereby the surfaces of the photosensitive drums 4 for the respective colors are exposed to the laser light in a scanning fashion. An LED exposure unit may be used in place of the laser scanner unit LB.

An intermediate transfer belt unit 11 serving as a transfer member is provided below the cartridges P in the third direction Z. The intermediate transfer belt unit 11 has a driving roller 14, a tension roller 13, and an assist roller 15, and a flexible transfer belt 12 is wrapped therearound.

The lower surfaces of the four photosensitive drums 4 are in contact with the upper surface of the transfer belt 12. A contact section between each photosensitive drum 4 (4Y, 4M, 4C, 4K) and the transfer belt 12 serves as a first transfer section 30 (30Y, 30M, 30C, 30K). First transfer rollers 16 (16Y, 16M, 16C, 16K) are provided facing the photosensitive drums 4 within the transfer belt 12.

A second transfer roller 17 is pressed against the driving roller 14 via the transfer belt 12. A contact section between the transfer belt 12 and the second transfer roller 17 serves as a second transfer section 31.

A feed unit 18 is provided below the intermediate transfer belt unit 11 in the third direction Z. The feed unit 18 has a paper feed tray 19 that accommodates recording media S in a stacked fashion, and also has a paper feed roller 20 that picks up and conveys each recording medium S from the paper feed tray 19.

An upper part of the apparatus body 72 in FIG. 1 is provided with a fixing unit 21 that fixes a toner image onto the recording medium S, and a discharge roller 22 that discharges the recording medium S having the toner image fixed thereon onto a discharge tray 23. The discharge roller 22 discharges the recording medium S in a direction extending along the first direction X. In this Example, the downstream side in the discharge direction in which the recording medium S is discharged toward the output tray 23 by the discharge roller 22 will be defined as the front side of the image forming apparatus 1, whereas the upstream side in the discharge direction will be defined as the rear side of the image forming apparatus 1.

[Image Forming Operation]

The operation for forming a full-color image is as follows. The photosensitive drums 4 are rotationally driven counterclockwise in FIG. 1 at a predetermined speed. The transfer belt 12 is rotationally driven forward (in the direction of an arrow C in FIG. 1) at a speed corresponding to the rotational speed of the photosensitive drums 4 in accordance with the rotation of the photosensitive drums 4. The laser scanner unit LB is also driven. In each cartridge P, the charge roller 5 uniformly charges the surface of the photosensitive drum 4 to a predetermined polarity and a predetermined potential in synchronization with the driving of the laser scanner unit LB. The laser scanner unit LB exposes the charged surface of each photosensitive drum 4 with the laser light L in a scanning fashion in accordance with an image signal for the corresponding color, so that an electrostatic latent image according to the image signal is formed on the surface of the photosensitive drum 4 for the corresponding color. In other words, the laser scanner unit LB exposes the photosensitive drum 4Y and the photosensitive drum 4M to the light, thereby forming a first electrostatic latent image and a second electrostatic latent image on the photosensitive drum 4Y and the photosensitive drum 4M, respectively. Likewise, the laser scanner unit LB exposes the photosensitive drum 4C and the photosensitive drum 4K to the light, thereby forming a third electrostatic latent image and a fourth electrostatic latent image on the photosensitive drum 4C and the photosensitive drum 4K, respectively.

The electrostatic latent images on the photosensitive drums 4 for the respective colors are developed as a result of supplying of the toners to the photosensitive drums 4 from the developing rollers 6 rotationally driven clockwise in FIG. 1 at a predetermined speed. As a result of the electrophotographic image forming process described above, a yellow toner image is formed on the photosensitive drum 4Y in the cartridge PY. Then, the yellow toner image is first-transferred onto the transfer belt 12. Likewise, a magenta toner image is formed on the photosensitive drum 4M in the cartridge PM. Subsequently, the magenta toner image is first-transferred onto the transfer belt 12 so as to be superimposed on the yellow toner image on the transfer belt 12. A cyan toner image is formed on the photosensitive drum 4C in the cartridge PC. Then, the cyan toner image is first-transferred onto the transfer belt 12 so as to be superimposed on the yellow and magenta toner images on the transfer belt 12. A black toner image is formed on the photosensitive drum 4K in the cartridge PK. Then, the black toner image is first-transferred onto the transfer belt 12 so as to be superimposed on the yellow, magenta, and cyan toner image images on the transfer belt 12.

Accordingly, full-color unfixed toner images of the four colors, namely, yellow, magenta, cyan, and black, are formed on the transfer belt 12. On the other hand, recording media S are separated from each other and fed one-by-one from the paper feed tray 19 by the paper feed roller 20 at a predetermined control timing. Each recording medium S is introduced at a predetermined control timing to the second transfer section 31 serving as the contact section between the second transfer roller 17 and the transfer belt 12. While the recording medium S is being conveyed by the second transfer section 31, the four superimposed toner images on the transfer belt 12 are transferred onto the recording medium S. The recording medium S with the toner images transferred thereon receives heat and pressure from the fixing unit 21, so that the toner images are fixed onto the recording medium S. The recording medium S with the toner images fixed thereon is discharged onto the discharge tray 23 by the discharge roller 22.

[Mount Sections for Resupply Packages]

Figure 2A:
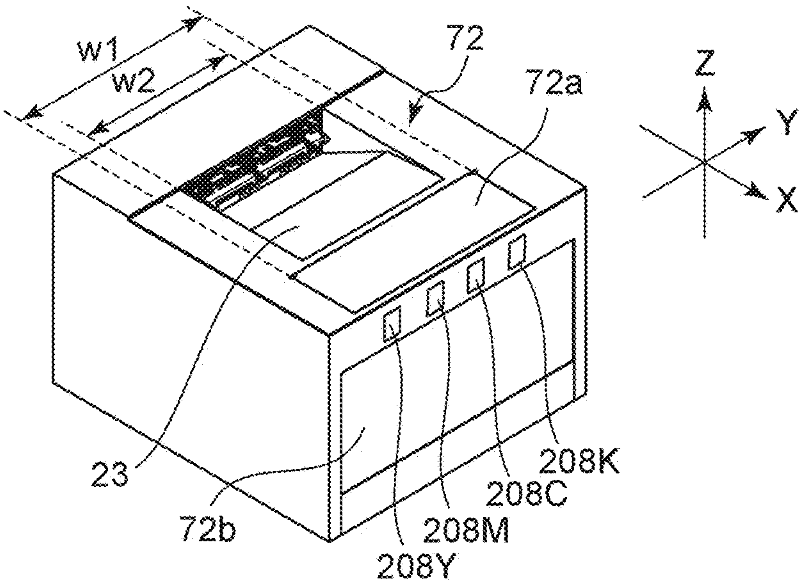
FIG. 2A is a perspective view of the image forming apparatus according to Example 1.
Figure 2B:
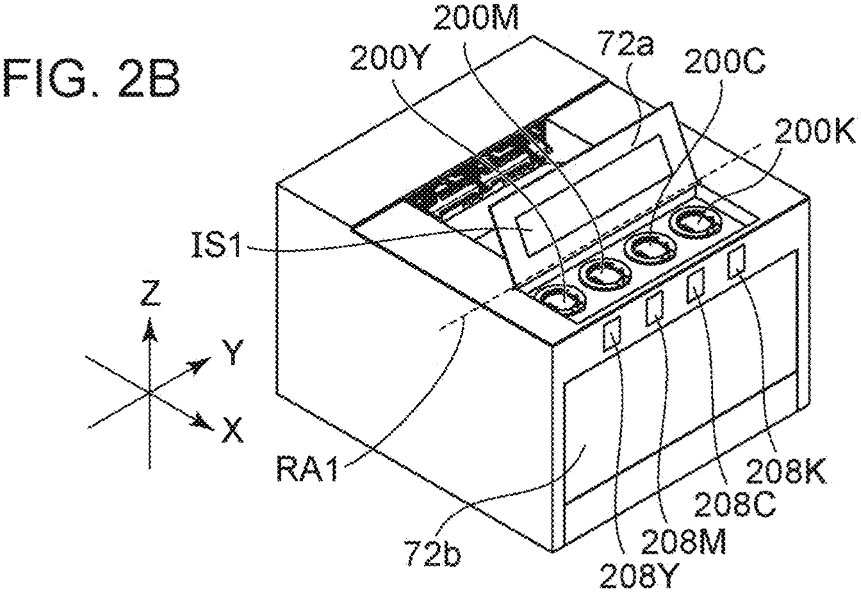
FIG. 2B is a perspective view of the image forming apparatus according to Example 1.
Figure 2C:
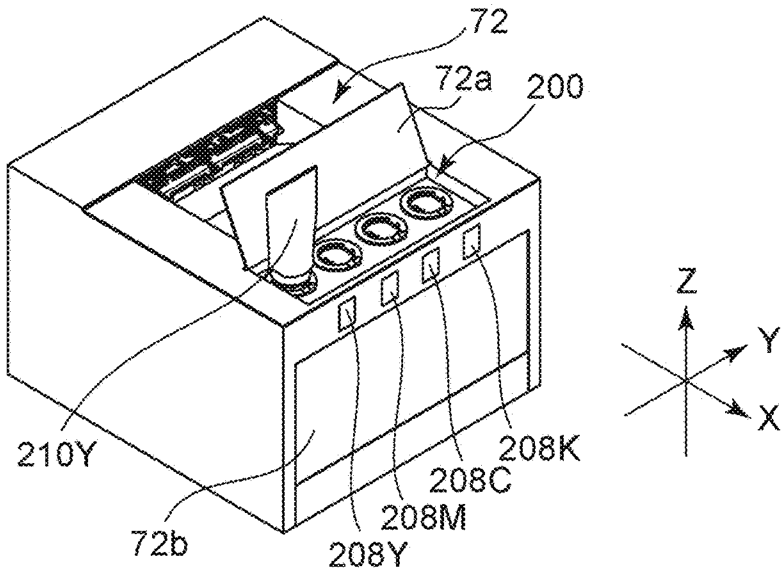
FIG. 2C is a perspective view of the image forming apparatus according to Example 1.
Figure 3:
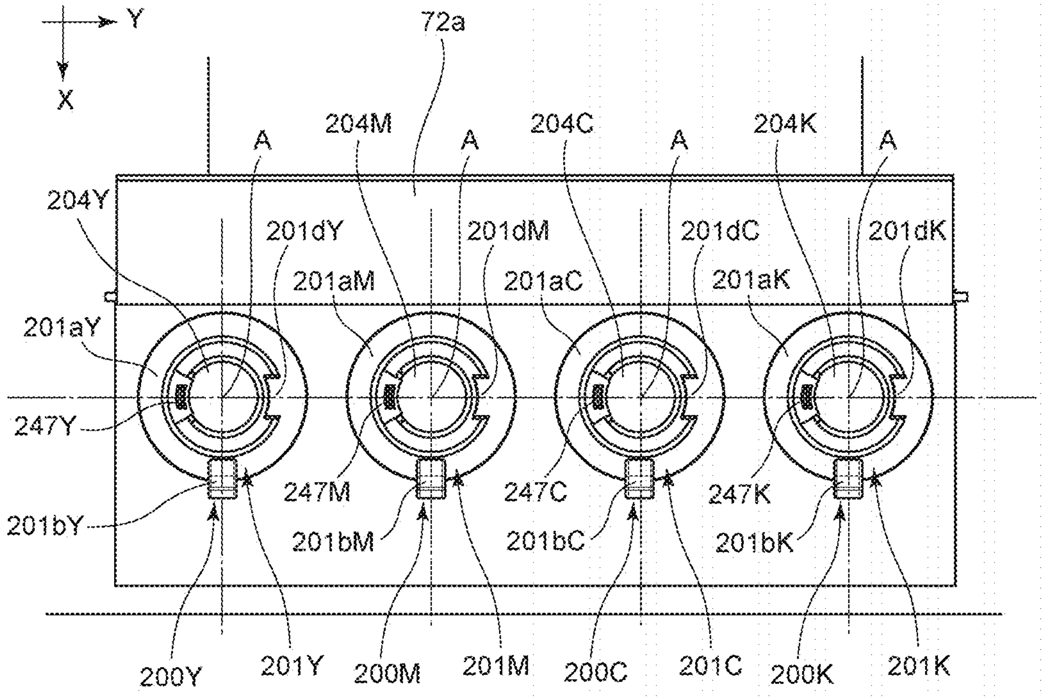
FIG. 3 is a top view of mount sections according to Example 1.
Figure 4A:
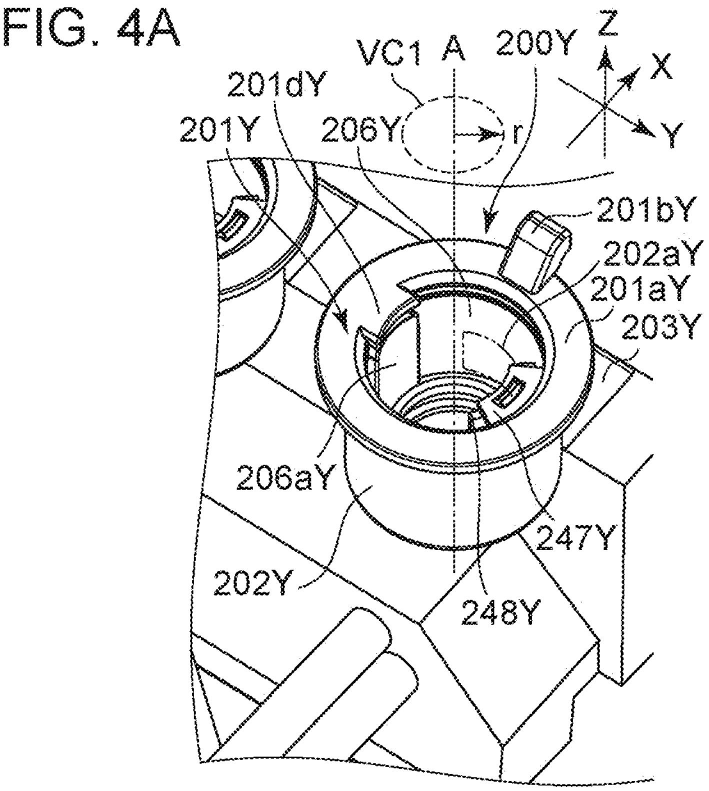
FIG. 4A is a perspective view of the mount sections according to Example 1.
Figure 4B:
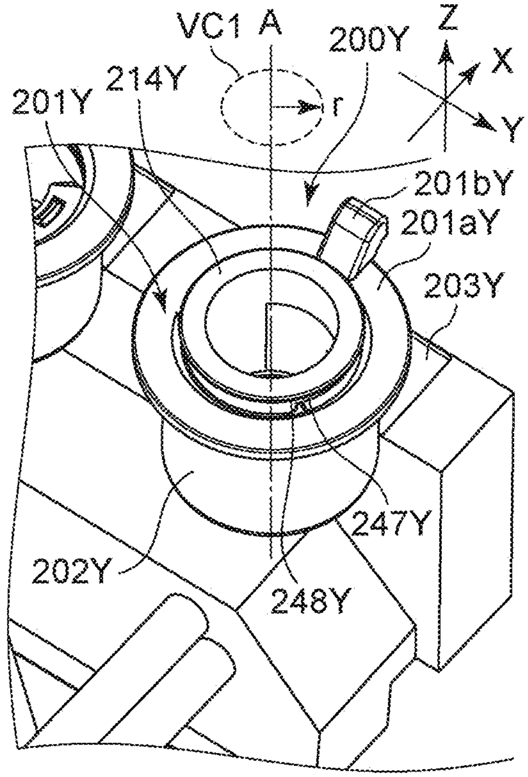
FIG. 4B is a perspective view of the mount sections according to Example 1.
Figure 4C:
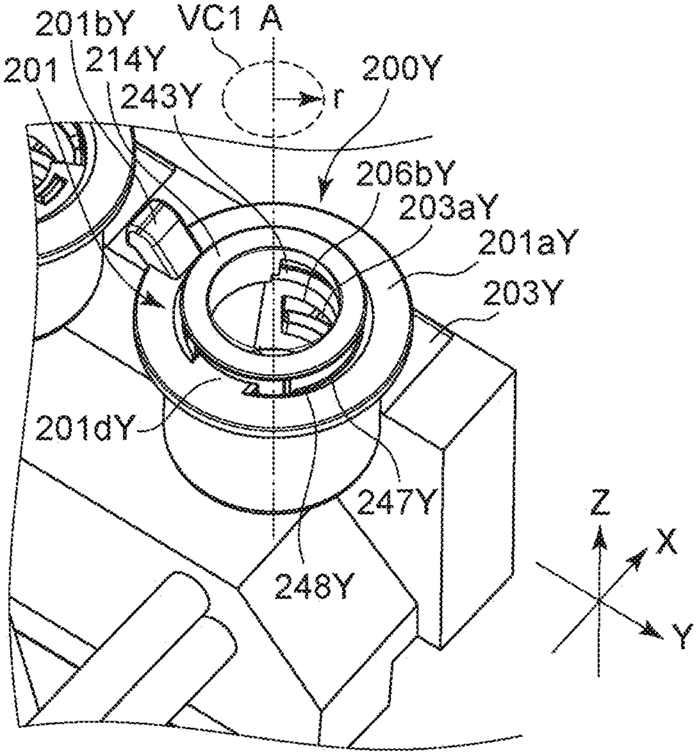
FIG. 4C is a perspective view of the mount sections according to Example 1.

Mount sections 200 for mounting resupply packages 210 will now be described with reference to FIGS. 2A to 4C. FIG. 2A is a perspective view of the image forming apparatus 1 in a state where a cover 72*a* is closed. FIG. 2B is a perspective view of the image forming apparatus 1 in a state where the cover 72*a* is open and the four mount sections 200 are exposed to the outside. FIG. 2C is a perspective view of the image forming apparatus 1 in a state where the cover 72*a* is open and a resupply package 210Y is mounted to a mount section 200Y. FIG. 3 is a top view of the mount sections 200 and the vicinity thereof when the cover 72*a* is open. FIG. 4A is a perspective view of the mount sections 200 in a state where the resupply packages 210 are not mounted thereto. FIG. 4B is a perspective view of the mount sections 200 in a state where the resupply packages 210 are mounted thereto and operation levers 201 are not rotated. FIG. 4C is a perspective view of the mount sections 200 in a state where the resupply packages 210 are mounted thereto and the operation levers 201 are rotated. For a better view, each of FIGS. 4B and 4C only shows a package shutter 214 (see FIGS. 5A and 5B) of each resupply package 210.

As shown in FIGS. 2A to 2C, the top surface at the front side of the image forming apparatus 1 is provided with the cover 72*a*, and the front surface is provided with a front door 72*b*. The mount sections 200 (200Y, 200M, 200C, 200K) are provided below the cover 72*a* so as to be arranged in the second direction Y. The mount sections 200 (200Y, 200M, 200C, 200K) will respectively be defined as a first mount section, a second mount section, a third mount section, and a fourth mount section. The cover 72*a* is rotatable about a rotational axis RA1 between a closed position for covering the mount sections 200, as shown in FIG. 2A, and an open position for exposing the mount sections 200, as shown in FIG. 2B. The rotational axis RA1 extends in the second direction Y. When the cover 72*a* is in the closed position, the top surface of the cover 72*a* is partially used as a paper output region. Thus, a width w1 of the cover 72*a* in the second direction Y is larger than a width w2 of the discharge tray 23 (paper discharge region). In other words, the ends of the cover 72*a* in the second direction Y are outside the ends of the discharge tray 23. This is to prevent the recording medium S discharged by the discharge roller 22 from getting caught by a step of the cover 72*a*. The cover 72*a* does not necessarily need to be rotationally movable and may be slidably movable between the closed position for covering the mount sections 200 and the open position for exposing the mount sections 200.

As shown in FIGS. 2B and 2C, the mount sections 200 are configured such that the resupply packages 210 accommodating the toners are detachable when the cover 72*a* is in the open position. By mounting the resupply packages 210 to the mount sections 200, the toners can be resupplied to the cartridges P for the respective colors from outside the image forming apparatus 1 without having to detach the cartridges P from the apparatus body 72. When the resupply packages 210 are mounted to the mount sections 200, the cover 72*a* is not movable from the open position to the closed position since the cover 72*a* interferes with the resupply packages 210. The mount sections 200 are provided at the downstream end of the image forming apparatus 1 in the direction in which the recording medium S is discharged by the discharge roller 22. Accordingly, the resupplying of the toners and the collecting of the discharged recording medium S can be performed from the same front side. When the cover 72*a* is in the open position, an instruction section IS1 provided at the rear surface of the cover 72*a* is viewable. The instruction section IS1 indicates a method for operating the mount sections 200 (a method for resupplying the toners by using the resupply packages 210).

Furthermore, the front surface of the image forming apparatus 1 is provided with indicators 208 (208Y, 208M, 208C, 208K) (labels, displays) for the respective colors. The arrangement of the indicators 208 is identical to the arrangement of the mount sections 200. Specifically, the indicator 208Y (first indicator) corresponds to yellow, the indicator 208M (second indicator) corresponds to magenta, the indicator 208C (third indicator) corresponds to cyan, and the indicator 208K (fourth indicator) corresponds to black. The indicator 208 for each color is constituted of an LED or sticker with the color corresponding to the mount section 200, and is provided to prevent the corresponding resupply package 210 from being mounted to the mount section 200 for a different color. Each indicator 208 may have a function for displaying the amount of toner remaining in the cartridge P (developer container 3) for the corresponding color. If each indicator 208 is to have the remaining toner display function, the instruction section IS1 may indicate a method of how the toner remaining amount is to be viewed.

Next, a specific configuration of the mount sections 200 will be described. As shown in FIG. 3 and FIGS. 4A to 4C, each mount section 200 (200Y, 200M, 200C, 200K) has the operation lever 201 (201Y, 201M, 201C, 201K), a reception frame 202 (202Y, 202M, 202C, 202K), and a main shutter 206 (206Y, 206M, 206C, 206K). The reception frame 202 (202Y, 202M, 202C, 202K) is provided with an inlet 202a (202aY, 202aM, 202aC, 202aK). The operation lever 201Y, the operation lever 201M, the operation lever 201C, and the operation lever 201K will respectively be defined as a first operation lever, a second operation lever, a third operation lever, and a fourth operation lever. Likewise, the reception frame 202Y, the reception frame 202M, the reception frame 202C, and the reception frame 202K will respectively be defined as a first reception frame, a second reception frame, a third reception frame, and a fourth reception frame. The main shutter 206Y, the main shutter 206M, the main shutter 206C, and the main shutter 206K will respectively be defined as a first main shutter, a second main shutter, a third main shutter, and a fourth main shutter. The inlet 202aY, the inlet 202aM, the inlet 202aC, and the inlet 202aK will respectively be defined as a first inlet, a second inlet, a third inlet, and a fourth inlet.

The mount section 200Y, the operation lever 201Y, the reception frame 202Y, and the main shutter 206Y will be described in detail with reference to FIGS. 4A to 4C. As shown in FIG. 3, the operation lever 201Y is disposed at the top surface of the image forming apparatus 1 and constitutes a part of a mount port 204Y used for inserting the distal end of the resupply package 210Y. The operation lever 201Y has a ring portion 201aY, a lever portion 201bY, and a lever protrusion 201d, and is rotatable. The operation lever 201Y is an operable section for opening and closing the main shutter 206Y provided at the mount section 200Y and a package shutter 214Y of the resupply package 210Y from the outside. The main shutter 206Y and the package shutter 214Y may be opened and closed automatically by using a sensor that detects that the resupply package 210Y is mounted to the mount section 200Y, and by using a driving mechanism and a motor (not shown) for driving the main shutter 206Y and the package shutter 214Y.

The reception frame 202Y is a tubular member serving as a base for the mount section 200Y, and has an inlet 202aY for receiving the yellow toner from the resupply package 210Y in a state where the resupply package 210Y is mounted to the mount section 200Y. The reception frame 202Y has a connection resupply path 202bY connected to a reserve tank 230Y, to be described later. The inner peripheral side of the reception frame 202Y is provided with a space for providing the main shutter 206Y. As shown in FIG. 4A, the reception frame 202Y has a nozzle positioning section 247Y and a nozzle guide 248Y disposed at the inner peripheral side of the main shutter 206Y.

The main shutter 206Y is a cylindrical member that is coaxial with the reception frame 202Y and has an upper opening through which the distal end of the resupply package 210Y can be inserted. The main shutter 206Y is provided at the inner peripheral side of the reception frame 202Y in a rotatable manner about a rotational axis A. The rotational axis A of the main shutter 206Y according to this Example extends in the third direction Z, or may extend in any direction intersecting with the second direction Y. As shown in FIG. 4C, the main shutter 206Y has a main shutter opening 206bY (first main shutter opening) in a side surface extending in the direction of the rotational axis A and a seal member 243Y provided to surround the peripheral edge of the main shutter opening 206bY. In FIG. 4A, the main shutter 206Y is in a non-communication position (first non-communication position) where the main shutter opening 206bY does not communicate with the inlet 202aY of the reception frame 202Y. Therefore, the toner resupplied from the resupply package 210Y mounted to the mount section 200Y is not discharged to the connection resupply path 202bY via the inlet 202aY. In FIG. 4A, the inlet 202aY is indicated with a dashed line since it is covered by the main shutter 206Y in the closed position. In FIG. 4C, the main shutter 206Y is in a communication position (first communication position) where the main shutter opening 206bY communicates with the inlet 202aY of the reception frame 202Y. Therefore, the toner resupplied from the resupply package 210Y mounted to the mount section 200Y can be discharged to the connection resupply path 202bY via the inlet 202aY and the main shutter opening 206bY. In other words, in the state where the resupply package 210Y is mounted to the mount section 200Y, the main shutter 206Y is configured to rotate about the rotational axis A between the communication position where the main shutter opening 206bY communicates with the inlet 202aY and the non-communication position where the main shutter opening 206bY does not communicate with the inlet 202aY.

As shown in FIG. 4A, the main shutter 206Y has a main shutter protrusion 206aY protruding inward in a radial direction r of an imaginary circle VC centered on the rotational axis A. The main shutter 206Y is configured to receive a rotational driving force from the package shutter 214Y of the resupply package 210Y via the main shutter protrusion 206aY.

The operation lever 201Y has a lever protrusion 201dY protruding inward in the radial direction r from the inner peripheral surface of the ring portion 201aY. When the resupply package 210Y is mounted to the mount section 200Y, the lever protrusion 201dY is configured to engage with a shutter recess 214b (see FIGS. 5A and 5B), to be described later, of the package shutter 214. When a user grabs the lever portion 201bY and rotates the operation lever 201 counterclockwise by 90 degrees, the main shutter 206Y is rotated from a closed position shown in FIG. 4B to an open position shown in FIG. 4C.

When an image is to be formed on the recording medium S, the main shutter 206Y is set in the non-communication position where the inlet 202aY does not communicate with the main shutter opening 206bY, so as to prevent the toner from being discharged from the inlet 202aY. Therefore, during image formation, the operation lever 201Y is set in a non-resupply position shown in FIG. 4A so that the main shutter 206Y is positionally set in the non-communication position. On the other hand, when the toner is to be resupplied from the resupply package 210Y to the cartridge PY, the inlet 202aY and the main shutter opening 206bY need to communicate with each other. Therefore, during resupplying of toner, the operation lever 201Y is set in a resupply position shown in FIG. 4C so that the main shutter 206Y is positionally set in the communication position.

The mount sections 200 (200M, 200C, 200K) for the remaining colors have the same configuration as the mount section 200Y.

In a state where a resupply package 210M is mounted to the mount section 200M, a main shutter 206M (second main shutter) is configured to rotate about the rotational axis A between a communication position (second communication position) where a main shutter opening 206bM (second main shutter opening) communicates with an inlet 202aM and a non-communication position (second non-communication position) where the main shutter opening 206bM does not communicate with the inlet 202aM. During image formation, the operation lever 201M is set in a non-resupply position so that the main shutter 206M is positionally set in the non-communication position. During resupplying of toner, the operation lever 201M is set in a resupply position so that the main shutter 206M is positionally set in the communication position.

In a state where a resupply package 210C is mounted to the mount section 200C, a main shutter 206C (third main shutter) is configured to rotate about the rotational axis A between a communication position (third communication position) where a main shutter opening 206*b*C (third main shutter opening) communicates with an inlet 202*a*C and a non-communication position (third non-communication position) where the main shutter opening 206*b*C does not communicate with the inlet 202*a*C. During image formation, the operation lever 201C is set in a non-resupply position so that the main shutter 206C is positionally set in the non-communication position. During resupplying of toner, the operation lever 201C is set in a resupply position so that the main shutter 206C is positionally set in the communication position.

In a state where a resupply package 210K is mounted to the mount section 200K, a main shutter 206K (fourth main shutter) is configured to rotate about the rotational axis A between a communication position (fourth communication position) where a main shutter opening 206*b*K (fourth main shutter opening) communicates with an inlet 202*a*K and a non-communication position (fourth non-communication position) where the main shutter opening 206*b*K does not communicate with the inlet 202*a*K. During image formation, the operation lever 201K is set in a non-resupply position so that the main shutter 206K is positionally set in the non-communication position. During resupplying of toner, the operation lever 201K is set in a resupply position so that the main shutter 206K is positionally set in the communication position.

[Resupply Packages]

The configuration of each resupply package 210 will now be described with reference to FIGS. 5A and 5B. The resupply packages 210 include the resupply package 210Y (first developer container) accommodating the yellow toner, the resupply package 210M (second developer container) accommodating the magenta toner, the resupply package 210C (third toner container) accommodating the cyan toner, and the resupply package 210K (fourth toner container) accommodating the black toner. These resupply packages 210 have identical structures except for the toners.

Figure 5A:
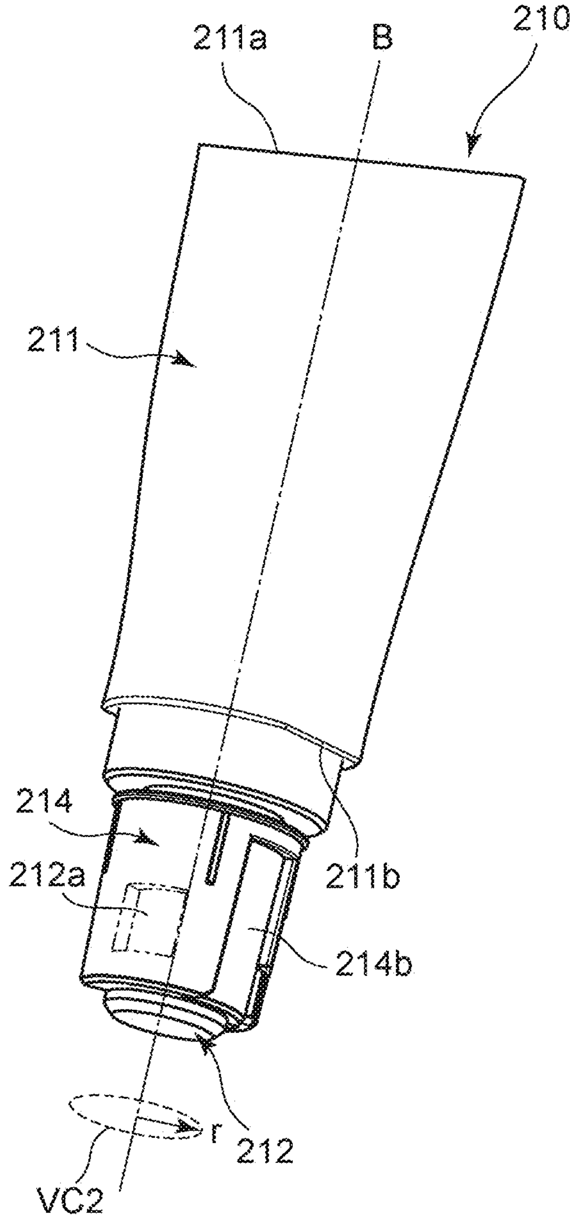
FIG. 5A is a perspective view of a resupply package according to Example 1.
Figure 5B:
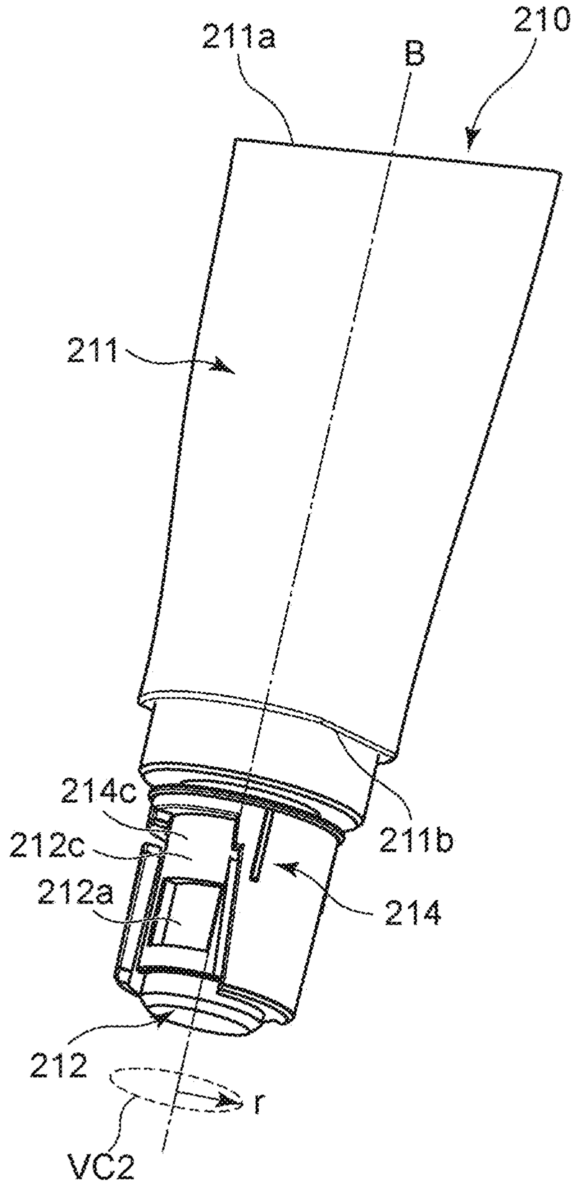
FIG. 5B is a perspective view of the resupply package according to Example 1.
Figure 6A:
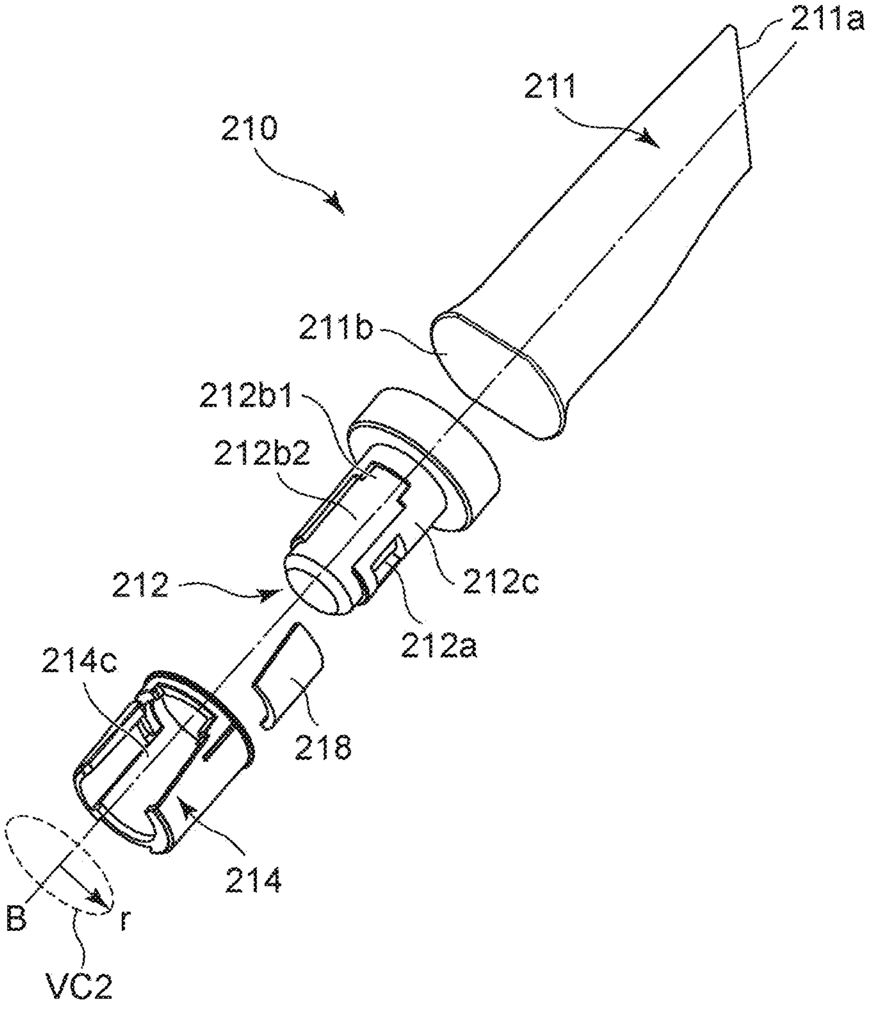
FIG. 6A is an exploded perspective view of the resupply package according to Example 1.
Figure 6B:
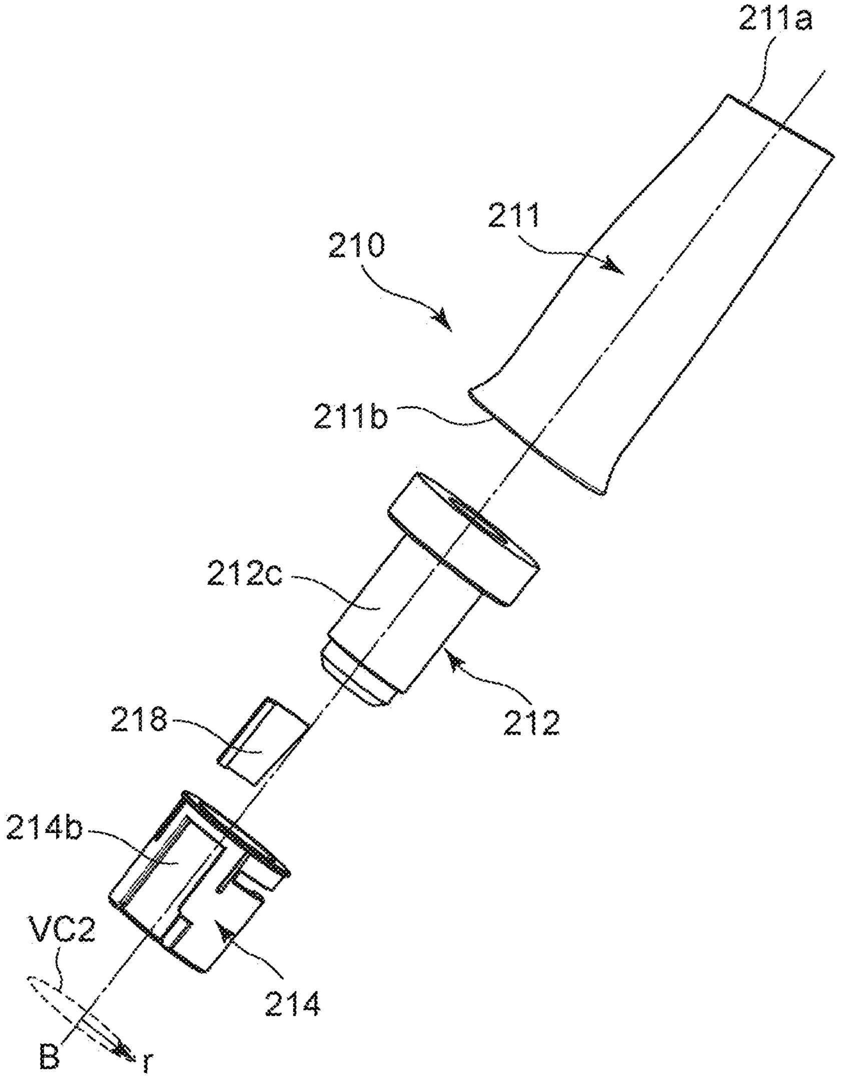
FIG. 6B is an exploded perspective view of the resupply package according to Example 1.

FIG. 5A is a perspective view illustrating each resupply package 210 when the package shutter 214 is positionally set in the closed position. FIG. 5B is a perspective view illustrating the resupply package 210 when the package shutter 214 is positionally set in the open position. FIG. 6A is an exploded perspective view of the resupply package 210. FIG. 6B is a perspective view of the resupply package 210 as viewed from a direction different from that in FIG. 6A.

The resupply package 210 (toner container, toner cartridge) has a pouch 211 (bag, toner receptacle) accommodating the toner, a nozzle 212 (discharger, nozzle) having an outlet 212*a* for discharging the toner accommodated in the pouch 211 outward from the resupply package 210, and a package shutter 214 (container shutter).

The package shutter 214 is configured to rotate (move) about a rotational axis B relative to the nozzle 212 between an open position for exposing the outlet 212*a* and a closed position for closing the outlet 212*a*. The package shutter 214 is provided at the outer side of the nozzle 212 in the radial direction of an imaginary circle VC centered on the rotational axis B. A seal member 218 slidable on an outer surface 212*c* of the nozzle 212 is fixed to the inner peripheral surface of the package shutter 214 oriented inward in the radial direction r. When the package shutter 214 is positionally set in the closed position, the seal member 218 seals a gap between the nozzle 212 and the package shutter 214 as it blocks the outlet 212*a* of the nozzle 212. The package shutter 214 has an opening 214*c* that exposes the outlet 212*a* of the nozzle 212 to the outside of the resupply package 210 when the package shutter 214 is in the open position.

The outlet 212*a* of the nozzle 212 is provided in the outer surface 212*c* extending in the direction of the rotational axis B. Specifically, the outlet 212*a* is oriented in a direction intersecting with (orthogonal to) the rotational axis B. In other words, the outlet 212*a* is oriented outward in the radial direction r of an imaginary circle VC1.

The pouch 211 is formed of a bag that is readily deformable in response to an external force. The pouch 211 according to this Example is formed by welding a polypropylene sheet. As an alternative to the pouch 211, a container, such as a bag composed of vinyl or paper or a bottle composed of resin, may be used. Furthermore, as shown in FIGS. 6A and 6B, the pouch 211 has a pouch opening 211*b* and a pouch end 211*a* at the end opposite the nozzle 212. The pouch 211 has a shape that becomes flat toward the pouch end 211*a*, and the pouch end 211*a* extends in a direction orthogonal to the rotational axis B.

As shown in FIG. 3 and FIGS. 4B and 4C, the nozzle 212 and the package shutter 214 constituting the distal end of the resupply package 210 are inserted into a mount port 204 of the mount section 200.

As shown in FIG. 6A, the nozzle 212 has a nozzle recess 212*b* recessed inward in the radial direction r of an imaginary circle VC2 relative to the outer surface 212*c*. The nozzle recess 212*b* has a first nozzle recess 212*b*1 at a side closer toward the pouch 211 (upstream side in the insertion direction) and a second nozzle recess 212*b*2 at a side farther from the pouch 211 (downstream side in the insertion direction). The first nozzle recess 212*b*1 has a smaller width in the circumferential direction of the imaginary circle VC2 than the second nozzle recess 212*b*2, and functions as a positioner (rotation regulator) for the reception frame 202 of the nozzle 212. When the package shutter 214 is in the closed position, the nozzle recess 212*b* is exposed to the outside of the resupply package 210 through the opening 214*c*.

The resupply package 210 is mounted to the mount section 200 while the second nozzle recess 212*b*2 is guided to a nozzle guide 248 of the reception frame 202. In a state where the resupply package 210 is completely mounted to the mount section 200, the first nozzle recess 212*b*1 engages with a nozzle positioning section 247 of the reception frame 202. Accordingly, the nozzle 212 is positioned in the circumferential direction of the imaginary circle VC2 relative to the reception frame 202. In other words, the rotation of the nozzle 212 in the circumferential direction of the imaginary circle VC2 is regulated relative to the reception frame 202.

As shown in FIGS. 5A, 5B, 6A, and 6B, the package shutter 214 has the shutter recess 214*b* recessed inward in the radial direction r from the outer peripheral surface located at the outer side in the radial direction r. The shutter recess 214*b* extends to an end of the package shutter 214 in the direction of the rotational axis B. In a state where the resupply package 210 is mounted to the mount section 200, the shutter recess 214*b* engages with the lever protrusion 201*d* of the operation lever 201. When the operation lever 201 is rotated, the shutter recess 214*b* receives a rotational driving force from the lever protrusion 201*d*, so that the package shutter 214 is rotated together with the operation lever 201. While the package shutter 214 is being rotated, the nozzle 212 does not rotate since the rotation thereof is regulated by the nozzle positioning section 247 of the mount section 200. Therefore, a rotational operation performed on the operation lever 201 causes the package shutter 214 to rotate between the closed position and the open position relative to the nozzle 212.

[Mounting of Resupply Package to Mount Section]

The resupply package 210 is mounted to the mount section 200 in a state where the package shutter 214 is in the closed position. First, the resupply package 210 is positioned relative to the mount section 200. Insertion into the mount port 204 of the mount section 200 is performed while the second nozzle recess **212*b*2 of the nozzle 212 and the shutter recess 214*b* of the package shutter 214 are positionally aligned with the nozzle guide 248 of the reception frame 202 and the lever protrusion 201*d* (main shutter protrusion 206*a*) of the lever 201, respectively. When the package shutter 214 is in the closed position, the nozzle recess 212*b* is exposed to the outside of the resupply package 210 through the opening 214*c* in the package shutter 214**.

The resupply package 210 is mounted to the mount section 200 while the second nozzle recess **212*b*2 of the nozzle 212 is guided to the nozzle guide 248 of the reception frame 202 and while the shutter recess 214*b* of the package shutter 214 is guided to the lever protrusion 201*d* and the main shutter protrusion 206*a***.

In a state where the resupply package 210 is completely mounted to the mount section 200, the second nozzle recess **212*b*2 is engaged with the nozzle positioning section 247, and the shutter recess 214*b* is engaged with the lever protrusion 201*d* and the main shutter protrusion 206*a*. In this completed mounted state, the opening 214*c* in the shutter 214 engages with a peripheral edge of a seal member 243 provided at the inner peripheral surface of the main shutter 206**.

When the operation lever 201 is rotated, the shutter recess **214*b* receives a rotational driving force from the lever protrusion 201*d*, whereby the package shutter 214 rotates together with the operation lever 201. When the package shutter 214 is rotated by the operation lever 201, the main shutter protrusion 206*a* receives a rotational driving force from the shutter recess 214*b*, whereby the main shutter 206 rotates together with the package shutter 214. According to the above-described configuration, when the operation lever 201 is in the non-resupply position, the main shutter 206 and the package shutter 214 are both in the closed position (closed state). When the operation lever 201 is in the resupply position, the main shutter 206 and the package shutter 214** are both in the open position (open state).

[Arrangement of Mount Sections 200]

Figure 7A:
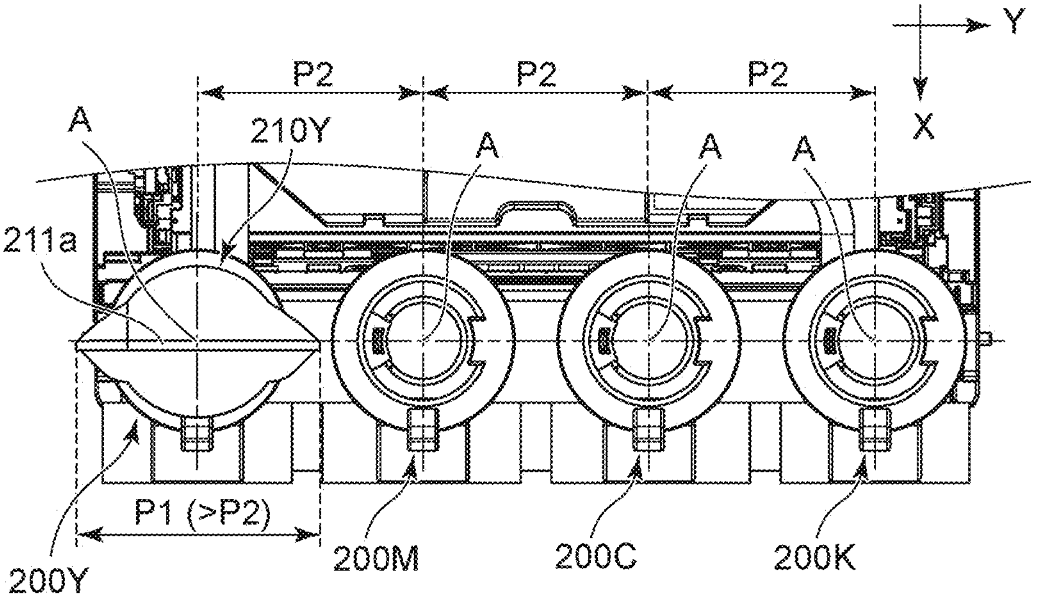
FIG. 7A is a top view of the mount sections according to Example 1 in a state where the resupply package is mounted thereto.
Figure 7B:
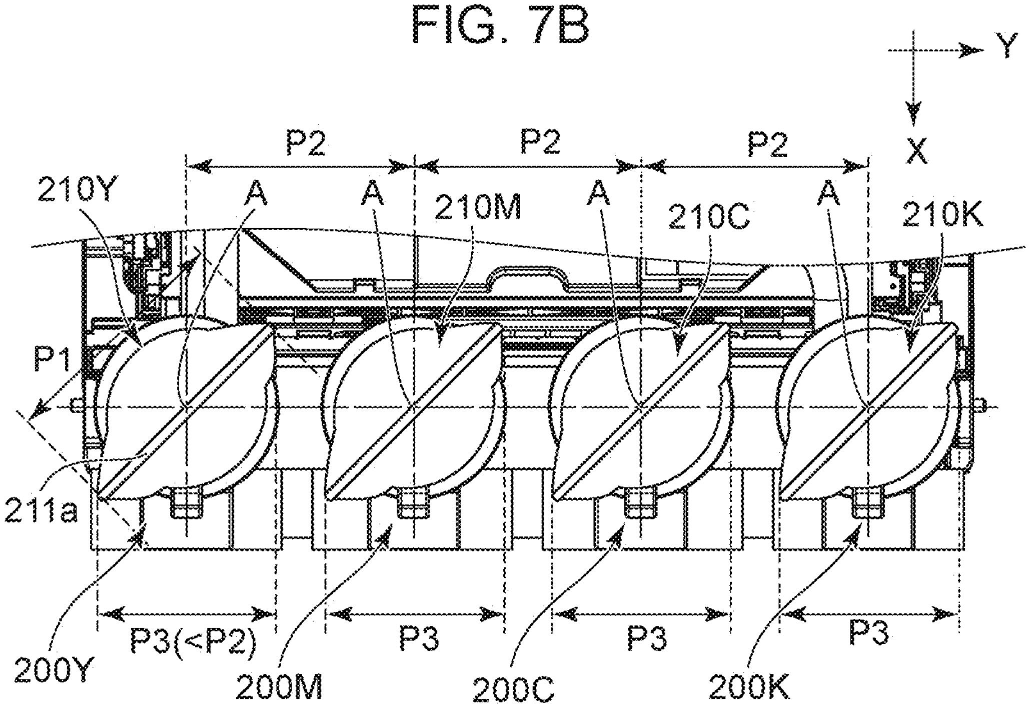
FIG. 7B is a top view of the mount sections according to Example 1 in a state where the resupply packages are mounted thereto.

The arrangement of the mount sections 200 will now be described. FIGS. 7A and 7B are enlarged views of the mount sections 200, as viewed in the third direction Z. FIG. 7A is an enlarged view of the mount sections 200 in a state where the resupply package 210Y is mounted to the mount section 200Y as one of the mount sections 200. The resupply package 210Y is mounted to the mount section 200Y such that the direction in which the end **211*a* of the pouch 211** extends when viewed in the third direction Z is aligned with the second direction Y.

Next, a pitch (distance) P2 between neighboring mount sections 200 will be described. When each resupply package 210 is viewed in the third direction Z in a state where the resupply package 210 is mounted to the corresponding mount section 200, an area having a maximum width in the second direction Y is the end **211*a* of the pouch 211. The pitch (distance) P2 between neighboring mount sections 200 according to this Example is set to be smaller than a length P1 in the second direction Y of the end 211*a* of the pouch 211 of the resupply package 210. Specifically, the distance P2 between the rotational axis A (first rotational axis) of the main shutter 206 of the mount section 200Y and the rotational axis A (second rotational axis) of the main shutter 206 of the mount section 200M is smaller than the length P1 of the end 211*a* of the resupply package 210Y. Likewise, the distance P2 between the rotational axis A of the main shutter 206 of the mount section 200M and the rotational axis A (third rotational axis) of the main shutter 206 of the mount section 200C is smaller than the length P1 of the end 211*a* of the resupply package 210Y. Likewise, the distance P2 between the rotational axis A (third rotational axis) of the main shutter 206 of the mount section 200C and the rotational axis A (fourth rotational axis) of the main shutter 206 of the mount section 200K is smaller than the length P1 of the end 211*a* of the resupply package 210Y. This configuration has two advantages. The first advantage is that the user can readily resupply toner by squeezing the pouch 211. The user standing at the front side of the image forming apparatus 1 can squeeze the pouch 211 more readily when the resupply package 210 is mounted to the mount section 200 in a state where the flat surface of the pouch 211 is oriented toward the front side. The second advantage is that the image forming apparatus 1 can be reduced in size by reducing the pitch between the mount sections 200 in the second direction Y. Since it is conceivable that the resupply packages 210 are not to be used by being mounted simultaneously to the four mount sections 200**, size reduction is prioritized.

In the state where the resupply package 210 according to this Example is mounted to the mount section 200, the area with the maximum width is the end **211*a* of the pouch 211, as viewed in the third direction Z. However, the resupply package 210 is not limited to this and may be such that the central area of the pouch 211 in the third direction Z (mounting direction) or the outer-diameter area of the nozzle may serve as the area having the maximum width. When viewed in the third direction Z, the pitch (distance) P2 between neighboring mount sections 200 may be smaller than the area having the maximum width in the resupply package 210** in the second direction Y.

As a modification of Example 1, a mountable configuration to the mount section 200 is conceivable such that the direction in which the end **211*a* of the pouch 211 extends intersects with both of the first direction X and the second direction Y when viewed in the third direction Z. For example, the direction in which the end 211*a* of the pouch 211 extends is 45 degrees relative to the second direction Y, as in FIG. 7B. Accordingly, a distance P3 of the end 211*a* of the pouch 211 in the second direction Y can be set to be smaller than the pitch (distance) P2 between neighboring mount sections 200. Consequently, the four resupply packages 210 can be mounted simultaneously to the corresponding mount sections 200 while ensuring the ease of resupply to a certain extent. Moreover, the image forming apparatus 1** can be reduced in size.

[Toner Resupply Path]

A toner resupply path from each mount section 200, to which the corresponding resupply package 210 according to this Example is mounted, to the corresponding cartridge P will now be described with reference to FIGS. 8A to 10D. The toner resupply path mentioned here is a passage along which the toner travels.

Figure 8A:
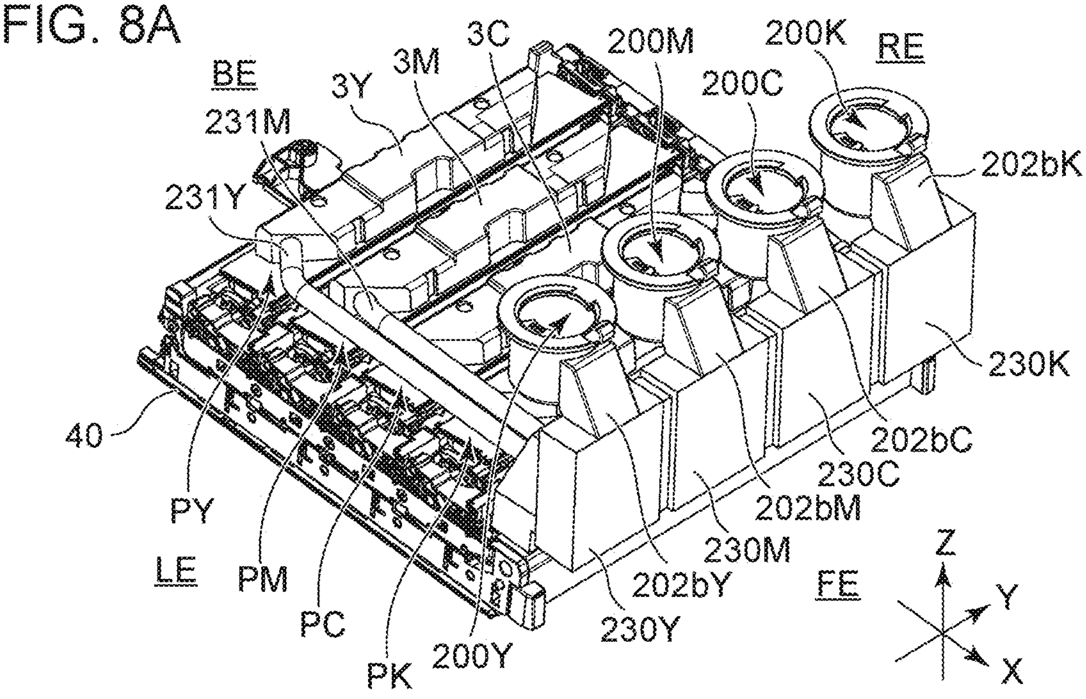
FIG. 8A is a perspective view of the mount sections and a drawer unit according to Example 1.
Figure 8B:
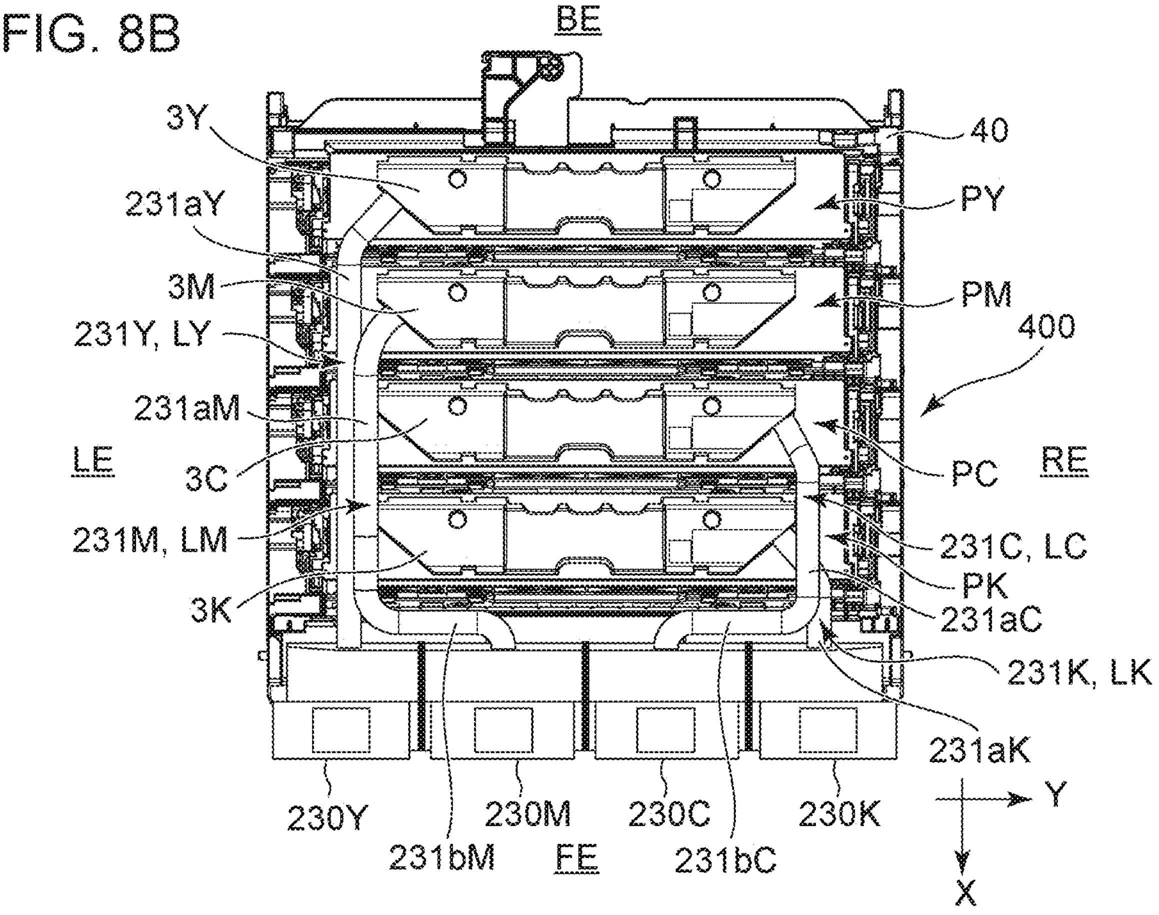
FIG. 8B is a top view of the mount sections and the drawer unit according to Example 1.
Figure 9A:
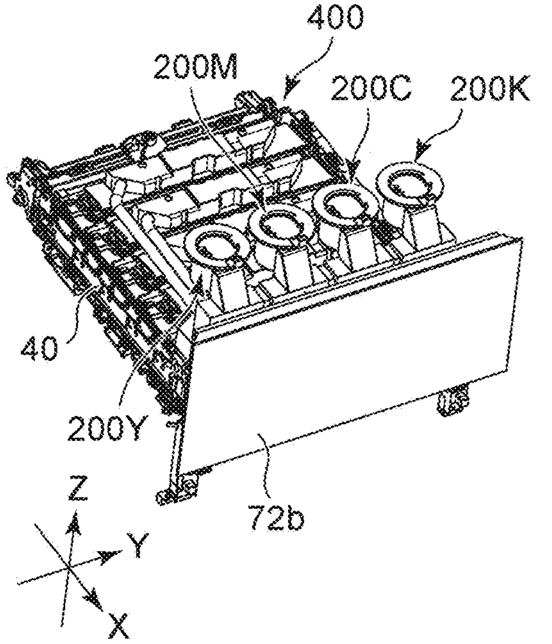
FIG. 9A is a perspective view and a top view of a front door, the mount sections, reserve tanks, and the drawer unit according to Example 1.
Figure 9B:
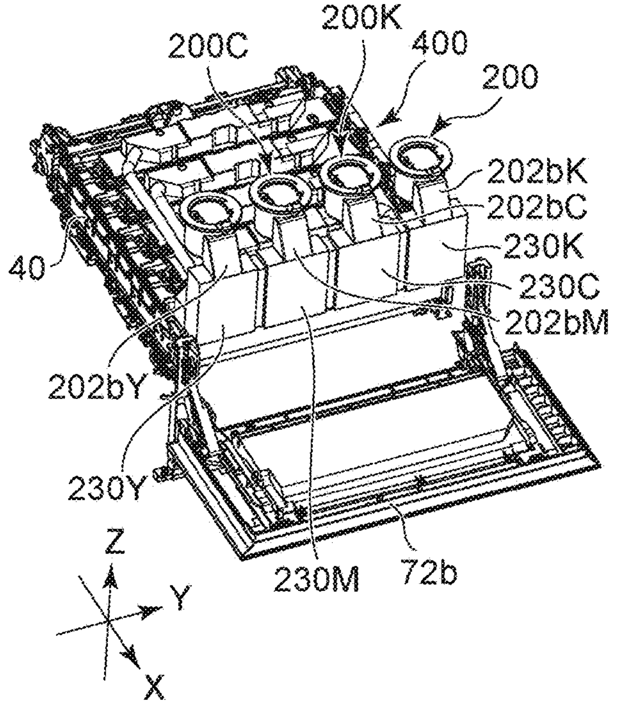
FIG. 9B is a perspective view and a top view of the front door, the mount sections, the reserve tanks, and the drawer unit according to Example 1.
Figure 9C:
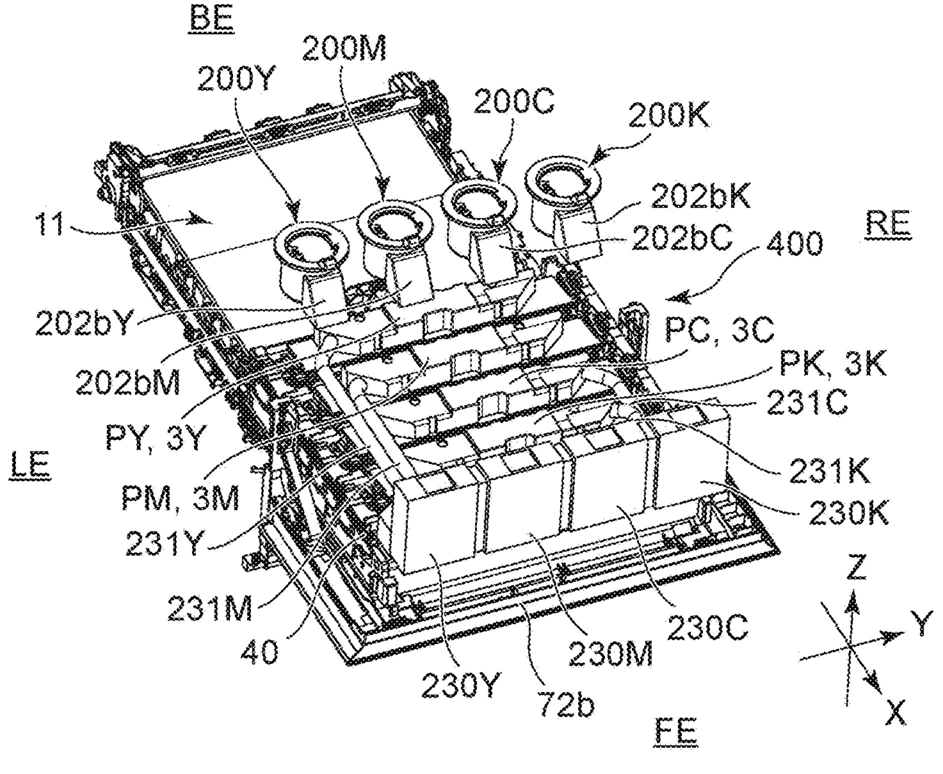
FIG. 9C is a perspective view and a top view of the front door, the mount sections, the reserve tanks, and the drawer unit according to Example 1.

FIG. 8A is a perspective view of the mount sections 200 and a tray 40 equipped with reserve tanks 230 and the cartridges P. FIG. 8B is a top view of the tray 40 equipped with the reserve tanks 230 and the cartridges P, as viewed in the third direction Z. FIGS. 9A to 9C are perspective views illustrating how the tray 40 equipped with the cartridges P and the reserve tanks 230 is drawn outward. FIGS. 10A to 10D are cross-sectional views of each mount section 200, each reserve tank 230, and a surrounding area thereof.

In FIGS. 8A and 8B and FIGS. 9A to 9C, the cartridges P for the respective colors are arranged in the first direction (X direction). The mount sections 200 (200Y, 200M, 200C, 200K) connected to the cartridges P for the respective colors are arranged in the second direction Y intersecting with (orthogonal to) the first direction. The reserve tanks 230 (230Y, 230M, 230C, 230K) configured to temporarily accommodate the toners are provided below the mount sections 200. The reserve tanks 230 (230Y, 230M, 230C, 230K) will respectively be defined as a first intermediate receptacle, a second intermediate receptacle, a third intermediate receptacle, and a fourth intermediate receptacle. The mount sections 200 and the reserve tanks 230 are connected to each other by connection resupply paths 202*b* (202*b*Y, 202*b*M, 202*b*C, 202*b*K). The connection resupply path 202*b*Y, the connection resupply path 202*b*M, the connection resupply path 202*b*C, and the connection resupply path 202*b*K will respectively be defined as a first connection resupply path, a second connection resupply path, a third connection resupply path, and a fourth connection resupply path.

The reserve tank 230 for each color is disposed below the corresponding mount section 200 in the third direction Z intersecting with (orthogonal to) both of the first direction and the second direction. Specifically, the reserve tanks 230Y, 230M, 230C, and 230K are respectively disposed below the mount section 200Y, the mount section 200M, the mount section 200C, and the mount section 200K so as to at least partially overlap therewith when viewed in the third direction Z.

In the configuration according to this Example, the toners resupplied from the mount sections 200 are moved to the reserve tanks 230 via the connection resupply paths 202*b*, and are conveyed to the cartridges P via conveyance passages 231. As shown in FIG. 8B, resupplying to the cartridge PY (developer container 3Y) and the cartridge PM (developer container 3M) is performed by respectively using a conveyance passage 231Y (first conveyance passage) and a conveyance passage 231M (second conveyance passage) that are located toward a first end LE of the cartridges P in the second direction Y. Resupplying to the cartridge PC (developer container 3C) and the cartridge PK (developer container 3K) is performed by using a conveyance passage 231C (third conveyance passage) and a conveyance passage 231K (fourth conveyance passage) that are located toward a second end RE in the second direction Y. As shown in FIG. 8B, in this Example, assuming that the lengths of the conveyance passage 231Y, the conveyance passage 231M, the conveyance passage 231C, and the conveyance passage 231K are defined as LY, LM, LC, and LK, the following relationships are satisfied: LY>LK, LM>LC, LC>LK. However, the relationships are not limited to the above.

As shown in FIG. 8B, the conveyance passage 231Y extends from the reserve tank 230Y to the developer container 3Y. The conveyance passage 231Y has a portion 231*a*Y extending from the reserve tank 230Y toward a rear-surface end BE of the image forming apparatus 1 in the first direction X, and is connected to the developer container 3Y. The conveyance passage 231M extends from the reserve tank 230M to the developer container 3M. The conveyance passage 231M has a portion 231*b*M extending in the second direction Y from the reserve tank 230M toward the first end LE of the image forming apparatus 1 and a portion 231*a*M extending in the first direction X toward the rear-surface end BE of the image forming apparatus 1, and is connected to the developer container 3M. The conveyance passage 231K extends from the reserve tank 230K to the developer container 3K. The conveyance passage 231K has a portion 231*a*K extending in the first direction X from the reserve tank 230K toward the rear-surface end BE, and is connected to the developer container 3K. The conveyance passage 231C extends from the reserve tank 230C to the developer container 3C. The conveyance passage 231C has a portion 231*b*C extending in the second direction Y from the reserve tank 230C toward the second end RE of the image forming apparatus 1 and a portion 231*a*C extending in the first direction X toward the rear-surface end BE, and is connected to the developer container 3C. As described above, the reason that the conveyance passages 231 are disposed to avoid the central area in the second direction Y is to avoid the laser light path L from the laser scanner unit LB. This will be described later.

As an alternative to this Example in which the reserve tanks 230 are independent of each other for the respective colors, a single reserve tank may be provided with three partitions so as to have temporary accommodation spaces for the four colors.

In order to perform maintenance or replacement of the cartridges P to cope with services, it is preferable that the cartridges P are easily accessible. In this Example, the cartridges P, the reserve tanks 230, and the conveyance passages 231 are equipped in the tray 40 (movable member) so as to be integrally drawable as a drawer unit 400 toward the front side relative to the apparatus body 72 (intermediate transfer belt unit 11). FIGS. 9A and 9B are perspective views of the drawer unit 400 in a state where the front door 72*b* is closed and opened, respectively. FIG. 9C is a perspective view of the drawer unit 400 in a state where the drawer unit 400 is drawn outward toward the front side.

In order to access the cartridges P, the front door 72*b* is first opened, as shown in FIG. 9B. Then, as shown in FIG. 9C, the drawer unit 400 is drawn outward toward the front side. In this Example, the mount sections 200, the connection resupply paths 202*b*, the reserve tanks 230, and the conveyance passages 231 constitute resupply paths from the resupply packages 210 to the cartridges P. In the configuration according to this Example, when the drawer unit 400 is to be drawn outward, as shown in FIG. 9C, the connection resupply paths 202*b* and the reserve tanks 230 are separated from each other by being disconnected from each other. The connection resupply paths 202*b* and the reserve tanks 230 may be disconnected from each other in conjunction with the opening motion of the front door 72*b*. The tray 40 is movable relative to the apparatus body 72 (intermediate transfer belt unit 11) between a first position (see FIG. 9B) where the reserve tank 230Y communicates with the inlet 202*a*Y and the reserve tank 230M communicates with the inlet 202*am* and a second position (FIG. 9C) where the reserve tank 230Y does not communicate with the inlet 202*a*Y and the reserve tank 230M does not communicate with the inlet 202*a*M. In the first position, the reserve tank 230C communicates with the inlet 202*a*C, and the reserve tank 230K communicates with the inlet 202*a*K. In the second position, the reserve tank 230C does not communicate with the inlet 202*a*C, and the reserve tank 230K does not communicate with the inlet 202*a*K. The second position is different from the first position in the first direction X, and is a position where the developing units 9 are exposed to the outside of the apparatus body 72. In the configuration according to this Example, the mount sections 200 as sections to which the resupply packages 210 are to be mounted are fixed to the apparatus body 72. Alternatively, the developing units 9, the drum units 8, the reserve tanks 230, and the conveyance passages 231 may be secured to the apparatus body 72.

Figure 10A:
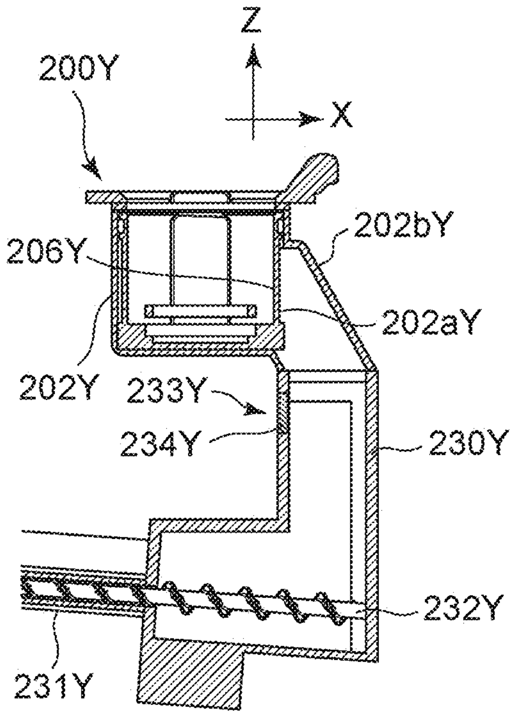
FIG. 10A is a cross-sectional view of the resupply package, the mount section, and the reserve tank according to Example 1.
Figure 10B:
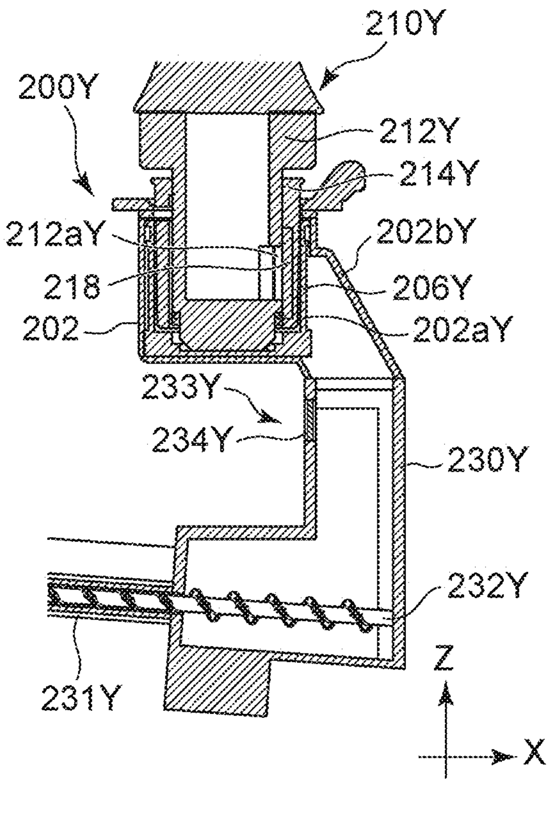
FIG. 10B is a cross-sectional view of the resupply package, the mount section, and the reserve tank according to Example 1.
Figure 10C:
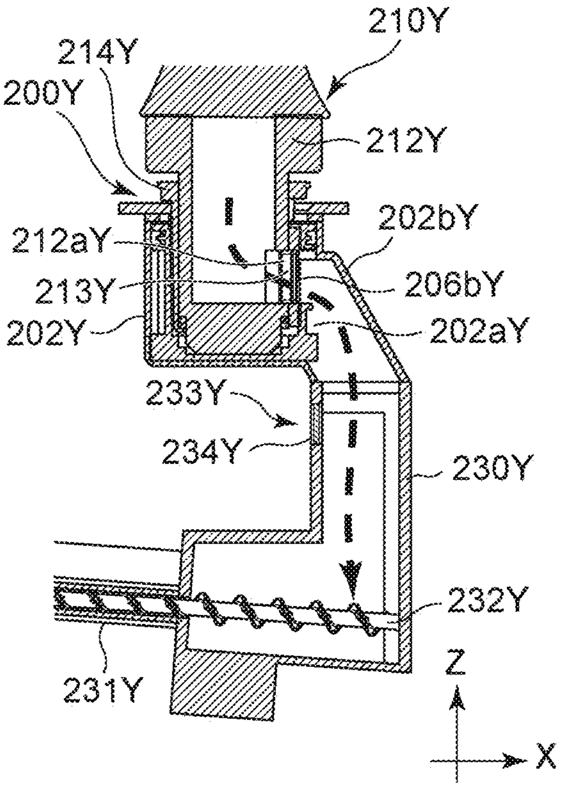
FIG. 10C is a cross-sectional view of the resupply package, the mount section, and the reserve tank according to Example 1.
Figure 10D:
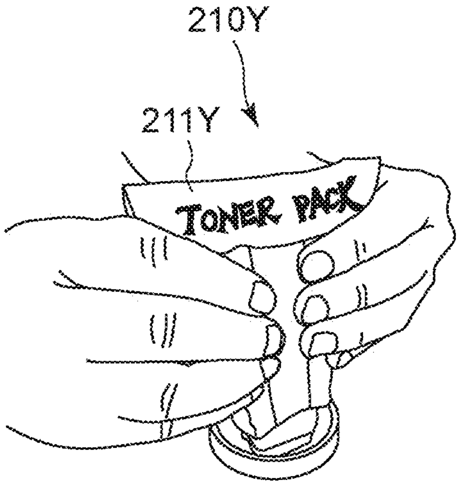
FIG. 10D illustrates the resupply package according to Example 1.

Next, the layout of the toner resupply paths from the resupply packages 210 to the reserve tanks 230 will be described with reference to FIGS. 10A to 10D. The yellow toner resupply path will be described. FIG. 10A is a cross-sectional view of the reserve tank 230Y in a state where the resupply package 210Y is not mounted to the mount section 200Y. FIG. 10B is a cross-sectional view of the reserve tank 230Y when the resupply package 210Y is mounted to the mount section 200Y, the package shutter 214Y is in the closed position, and the main shutter 206Y is in the non-communication position. FIG. 10C is a cross-sectional view of the reserve tank 230Y when the resupply package 210Y is mounted to the mount section 200Y, the package shutter 214Y is in the open position, and the main shutter 206Y is in the communication position. FIG. 10D illustrates how the user is performing resupplying by using one of the resupply packages 210.

In FIG. 10A, the path to the inlet 202*a*Y is blocked by the main shutter 206Y. The inlet 202*a*Y communicates with the reserve tank 230Y provided with a screw 232Y at the bottom thereof. The screw 232Y is configured to convey the toner from the corresponding reserve tank 230 to the conveyance passage 231Y. In FIG. 10B, the path to the inlet 202*a*Y is blocked by the main shutter 206Y, similarly to FIG. 10A. Moreover, an outlet 212*a*Y of a nozzle 212Y in the resupply package 210Y mounted to the mount section 200Y is blocked by the package shutter 214Y (seal member 218Y). In FIG. 10C, the toner in the pouch 211Y is movable to the reserve tank 230Y via the outlet 212*a*Y of the nozzle 212Y, the inlet 202*a*Y of the reception frame 202Y, and the connection resupply path 202*b*Y. Because the reserve tank 230Y is disposed at the lower part of the mount section 200Y, the toner discharged from the nozzle 212Y falls downward due to its own weight. As shown in FIG. 10D, the user uses his/her fingers to squeeze the pouch 211Y of the resupply package 210Y, thereby resupplying the toner.

The capacity (volume) of the reserve tank 230Y is larger than the volume of toner accommodated in a new (unused) resupply package 210Y. The resupplying of toner by the user normally involves resupplying the entire toner at once from the resupply package 210Y. As shown in FIG. 10D, the pouch 211Y of the resupply package 210Y is compressed by the user, so that the toner in the pouch 211Y is discharged together with air to the reserve tank 230Y via the outlet 212*a*Y of the nozzle 212Y. Therefore, the reserve tank 230Y is provided with a vent 233Y for releasing the air. With the vent 233Y provided, a situation where a large amount of air is delivered to the developing unit 9Y during the resupplying of the toner can be suppressed. Consequently, toner leakage through a gap in the developing unit 9Y can be suppressed. The vent 233Y is disposed above a toner surface within the reserve tank 230Y. The vent 233Y is provided with a filter 234Y for preventing the toner from leaking out.

Since the toner resupply paths from the resupply packages 210 for the remaining colors to the reserve tanks 230 are similar to the toner resupply path from the resupply package 210Y to the reserve tank 230Y, descriptions thereof will be omitted. Moreover, since the capacities of the reserve tanks 230 (230M, 230C, 230K) are similar to that of the reserve tank 230Y, descriptions thereof will be omitted. The capacity (volume) of the reserve tank 230K may be larger than those of the reserve tanks 230 (230Y, 230M, 230C).

Next, the layout in a cross section orthogonal to the second direction Y of the conveyance passages 231 provided between the reserve tanks 230 and the cartridges P will be described with reference to FIGS. 10A to 10D and FIG. 11. The yellow conveyance passage 231Y will be described. As shown in FIGS. 10A to 10D, the toner moving into the reserve tank 230Y is temporarily accommodated at the bottom of the reserve tank 230Y. The reserve tank 230Y is connected to the conveyance passage 231Y for conveying the toner to the developer container 3Y of the cartridge PY. The conveyance passage 231Y is provided with the screw 232Y (first conveying means). The upstream end of the screw 232Y in the toner conveying direction is located within the reserve tank 230Y.

Figure 11:
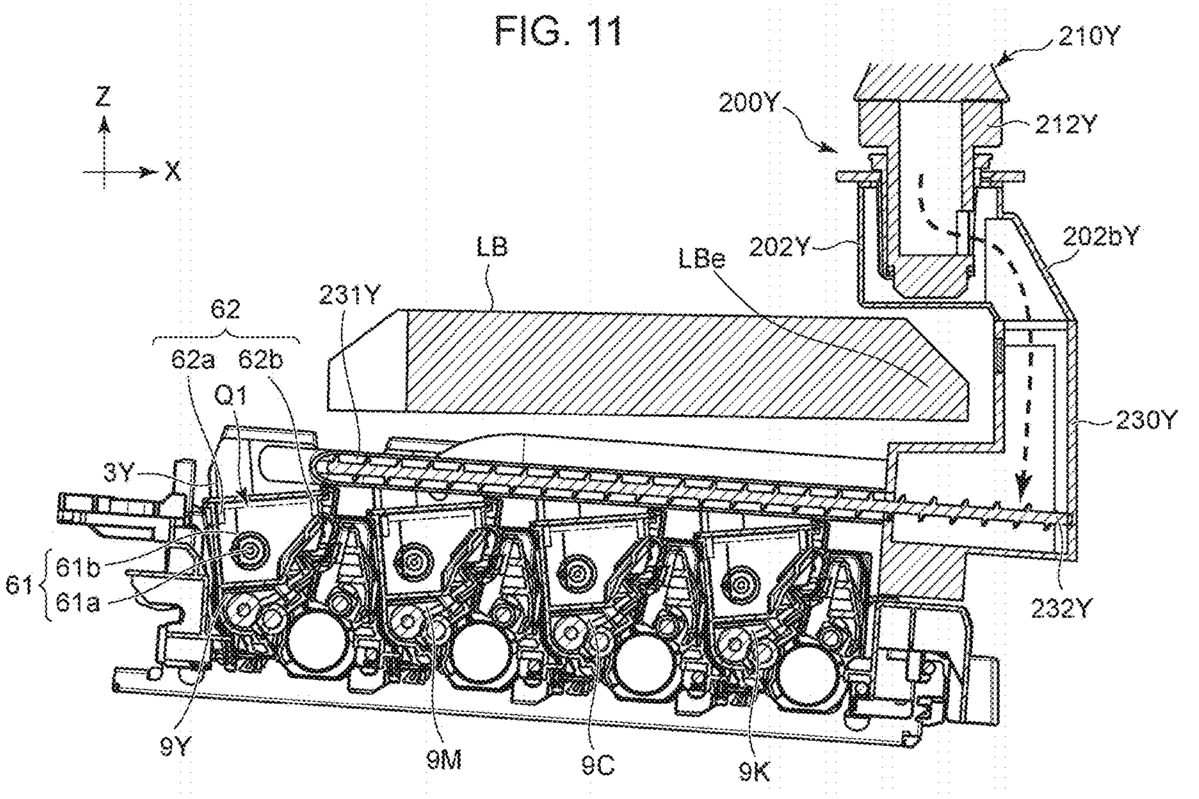
FIG. 11 is a cross-sectional view of a laser scanner unit and the drawer unit according to Example 1.

FIG. 11 is a cross-sectional view illustrating the toner resupply path for resupplying the toner from the mount section 200Y to the developer container 3Y of the cartridge PY through the reserve tank 230Y and the conveyance passage 231Y. One end of the conveyance passage 231Y is connected to the reserve tank 230Y, whereas the other end of the conveyance passage 231Y is connected to the developer container 3Y of the cartridge PY. The toner temporarily accommodated in the reserve tank 230Y is conveyed by the screw 232Y to the developer container 3Y through the conveyance passage 231Y. The screw 232Y extends in the first direction X. A front end LBe, in the first direction X, serving as a part of the laser scanner unit LB is provided between the mount section 200Y and the reserve tank 230Y in the third direction. In other words, the end LBe of the laser scanner unit LB overlaps the mount section 200Y and the reserve tank 230Y, as viewed in the third direction. Accordingly, the width of the image forming apparatus 1 in the first direction X is reduced, thereby contributing to size reduction.

The conveyance passage 231M, the conveyance passage 231C, and the conveyance passage 231K are also provided with a screw 232M (second conveying means), a screw 232C (third conveying means), and a screw 232K (fourth conveying means), respectively. Each screw 232 may be constituted of a plurality of screws provided parallel to each other in conformity with the orientation and the shape of the corresponding conveyance passage 231. In this Example, the conveying means used are the screws, but are not limited thereto. In the case where the extending direction changes midway, as in each conveyance passage 231 according to this Example, toner conveyance using air generated by a pump or the like is effective. By using a pump to generate air flowing from each reserve tank 230 toward the corresponding developer container 3 inside the corresponding conveyance passage 231, the toner in the reserve tank 230 can be conveyed to the developer container 3. An alternative configuration involves conveying the toner by using a belt.

Figure 12A:
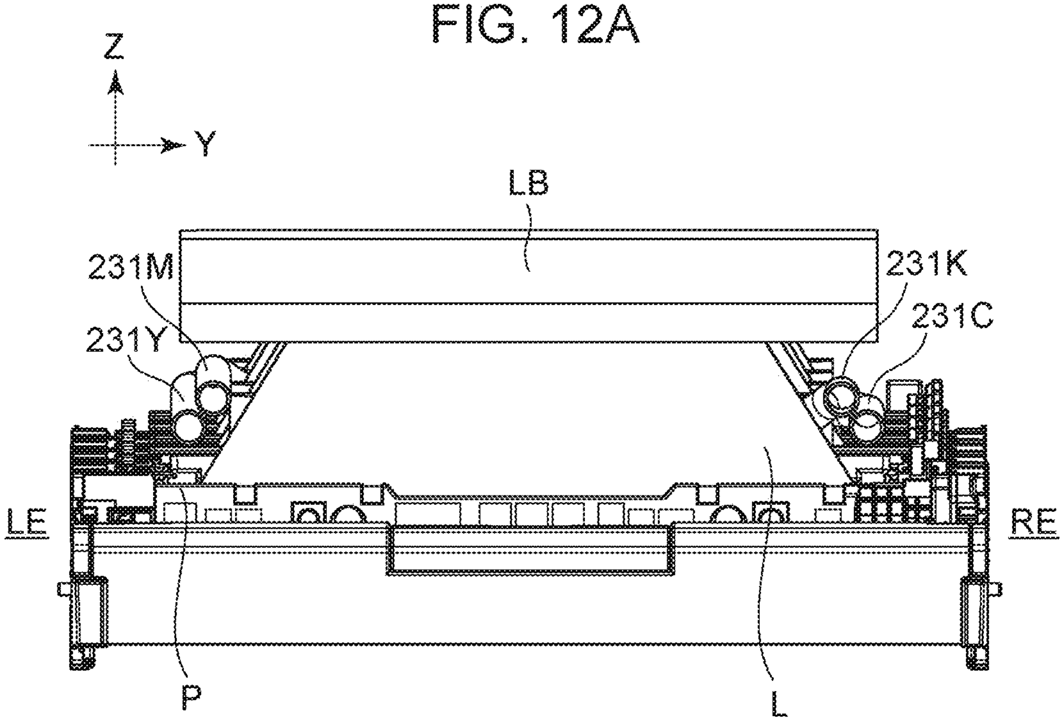
FIG. 12A is a cross-sectional view of the laser scanner unit, toner conveyance passages, and cartridges according to Example 1.
Figure 12B:
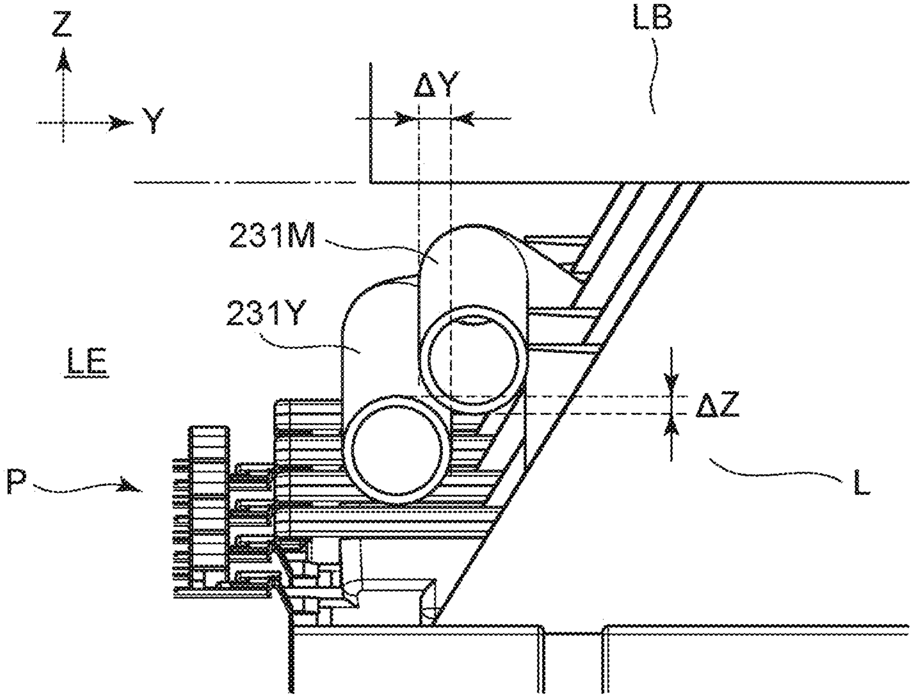
FIG. 12B is a cross-sectional view of the laser scanner unit, the toner conveyance passages, and the cartridges according to Example 1.

Next, the arrangement of the conveyance passages 231 in a cross section orthogonal to the first direction X will be described with reference to FIGS. 12A and 12B. FIG. 12A is a cross-sectional view of the conveyance passages 231, taken in a direction orthogonal to the first direction X. FIG. 12B is an enlarged cross-sectional view of the conveyance passages 231 at the front left side in FIG. 12A. In FIG. 11, the reserve tanks 230 and the like have been omitted for a simpler illustration, and the laser light path L is made visible.

The positions of the conveyance passages 231 in the second direction Y will now be described. The conveyance passages 231 are disposed to not overlap the laser light path L in the second direction Y, so that the conveyance passages 231 do not block the laser light path L during image formation. In this Example, two conveyance passages 231 and two conveyance passages 231 are disposed at the first end LE and the second end RE, respectively, of the image forming apparatus 1 with the laser light path L interposed therebetween. Specifically, in the second direction Y, the conveyance passage 231Y and the conveyance passage 231M are disposed at the first end LE, whereas the conveyance passage 231C and the conveyance passage 231K are disposed at the second end RE.

The positions of the conveyance passages 231 in the third direction Z will now be described. The conveyance passages 231 are disposed below the laser scanner unit LB and above the cartridges P (developing units 9, developer containers 3). Specifically, the conveyance passages 231 are disposed between the laser scanner unit LB and the cartridges P (developing units 9, developer containers 3) in the third direction Z. In other words, when viewed in the third direction Z, the conveyance passages 231 overlap the laser scanner unit LB and the cartridges P (developing units 9, developer containers 3). The laser light path L increases in width in the second direction Y as it approaches the cartridges P from the laser scanner unit LB. Therefore, as shown in FIGS. 12A and 12B, there is a gap between a portion of the laser light path L close to the cartridges P and the laser scanner unit LB, and the conveyance passages 231 are disposed in this gap.

Specifically, the conveyance passages 231 are provided such that the conveyance passages 231 are located between the laser scanner unit LB and the laser light path L in the third direction Z. Furthermore, as shown in FIG. 12B, at the first end LE, the conveyance passage 231Y and the conveyance passage 231M are disposed to overlap each other by ΔZ as viewed in the Y direction, and to overlap each other by ΔY as viewed in the Z direction. Specifically, the configuration where at least a part of the conveyance passage 231Y overlaps the conveyance passage 231M when viewed in the third direction Z saves space in the second direction Y. The configuration where at least a part of the conveyance passage 231Y overlaps the conveyance passage 231M when viewed in the second direction Y saves space in the third direction Z.

The above-described arrangement of the conveyance passages 231 in the cross section orthogonal to the first direction X leads to an effective use of space, thereby contributing to size reduction of the image forming apparatus 1.

[Detection of Toner Remaining Amount]

The configuration for detecting the amount of toner remaining in each cartridge P will now be described. As shown in FIG. 11, the corresponding conveyance passage 231 is connected to one end of the developer container 3Y in the second direction Y. The developer container 3Y is provided therein with a stirring member 61 that rotates about a rotation shaft 61*a* extending in the second direction Y. The stirring member 61 has the rotation shaft 61*a* and a sheet 61*b* fixed to the rotation shaft 61*a*. The stirring member 61 rotates by being driven by a driving motor so as to stir the toner in the developer container 3Y and also to convey the toner toward the developing roller 6Y. This stirring causes the toner in the developer container 3Y to be conveyed in the second direction Y and to be evened out so that unevenness is reduced. In this Example, the stirring member 61 may be a helical blade in place of the sheet 61*b*.

The stirring member 61 has a function for causing the toner not used for the development and separated from the developing roller 6Y to circulate within the developer container 3Y and for making the toner uniform within the developer container 3Y. The stirring member 61 is not limited to a rotating type. For example, the stirring member used may be of a swinging type.

The developer container 3Y is also provided with a remaining amount detector 62 as a sensor for detecting the amount of toner remaining in the developer container 3Y. The remaining amount detector 62 has a light emitter 62*a* and a light receiver 62*b*. Light emitted from the light emitter 62*a* travels through the developer container 3Y and is received by the light receiver 62*b*. Specifically, the light emitter 62*a* and the light receiver 62*b* constitute a remaining-amount-detector light path Q1 inside the developer container 3Y. The light emitter 62*a* and the light receiver 62*b* may be disposed inside the developer container 3Y, or may be disposed outside the developer container 3Y and be configured to use a light guide member to guide light into and out from the developer container 3Y.

In this Example, an LED is used as the light emitter 62*a*, and a phototransistor that switches to an on mode in response to light from the LED is used as the light receiver 62*b*. However, the configuration is not limited to this. For example, a halogen lamp or a fluorescent lamp may be used in place of the light emitter 62*a*, and a photodiode or an avalanche photodiode may be used in place of the light receiver 62*b*.

The light receiver 62*b* as a phototransistor receives the light output from the light emitter 62*a* and outputs a signal (electric current) according to the quantity of received light. This signal is converted into voltage and is input to an engine controller. Specifically, the light receiver 62*b* changes an output value based on the amount of toner accommodated in a receptacle 60. The engine controller determines whether or not the light receiver 62*b* has received light from the light emitter 62*a* based on an input voltage level. The engine controller calculates the amount of toner in the developer container 3 based on the length of time that the light receiver 62*b* detects light when the toner in the developer container 3Y is stirred for a certain time period by the stirring member 61. In other words, a ROM of the engine controller has preliminarily stored therein a table from which the remaining amount of toner can be output from the light reception time period when the toner is conveyed by the stirring member 61, and the engine controller predicts/calculates the remaining amount of toner based on this table.

When there is a large amount of toner remaining, the light reception time period by the light receiver 62*b* becomes shorter since the remaining-amount-detector light path Q1 tends to be blocked by the toner. In contrast, when there is a small amount of toner remaining, the light reception time period by the light receiver 62*b* becomes longer. Thus, the engine controller can determine the level of toner remaining in the receptacle 60 based on the light reception time period of the light receiver 62*b*.

The method for detecting/estimating the remaining amount of toner is not limited to the above-described method, and any of various known methods for detecting/estimating the remaining amount of toner may be employed. For example, two or more metallic plates or electrically-conductive resin sheets extending in the longitudinal direction of the developing roller may be disposed at the inner wall of the developer container 3Y, the capacitance between the two metallic plates or electrically-conductive resin sheets may be measured, and the remaining amount of toner may be detected/estimated. Alternatively, a load cell may be provided so as to support the developing unit 9Y from below, and the remaining amount of toner may be calculated based on the weight measured by the load cell. Another simpler alternative involves using a flag and a sensor and performing detection by being pressed by the toner equipped with the flag when the required amount of toner is resupplied.

Because the configuration for detecting the amount of toner remaining in each of the cartridges P for the remaining colors is similar to that for the cartridge PY, a description thereof will be omitted.

[Toner Resuppliable Condition]

As a toner resuppliable condition, it is preferable that the toner in each resupply package 210 can entirely be accommodated in the apparatus body 72 or the developer container 3 of the corresponding cartridge P. Therefore, it is preferable that the amount of toner remaining in the developer container 3 is detected by the remaining amount detector 62 (see FIG. 11) provided for the cartridge P, and that resupplying is possible only when the total capacity of toner that can be accommodated in the reserve tank 230, the connection resupply path 202*b*, and the conveyance passage 231 is greater than the toner capacity in the resupply package 210.

When the toner resuppliable condition is satisfied, the indicator 208 near the mount section 200 corresponding to each cartridge P is configured to notify the user of which of the toners is resuppliable (see FIGS. 2A to 2C).

As an alternative to this Example in which the remaining amount detector 62 provided within each cartridge P is configured to detect the remaining amount of toner, a remaining amount detector may be provided within each reserve tank 230 and detect the amount of toner remaining in the reserve tank 230. In this case, it is preferable that resupplying is possible only when the capacity of toner that can be accommodated in the reserve tank 230 is greater than the toner capacity in the resupply package 210.

In the configuration according to this Example, the operation lever 201 of the mount section 200 for the color satisfying the toner resuppliable condition is unlocked, and the operation lever 201 of the mount section 200 for the color not satisfying the toner resuppliable condition is not unlocked. This can prevent a situation where toner is resupplied as a result of mounting the resupply package 210 to the mount section 200 when the toner resuppliable condition is not satisfied.

In the configuration according to this Example described above, each cartridge P can be resupplied with toner by using a resupply package mounted to the mount section of the image forming apparatus without having to detach the cartridge from the image forming apparatus. In this Example, instead of a detachable cartridge, each process cartridge P (PY, PM, PC, PK) may be a process unit secured to the drawer unit 400.

Example 2

Example 2 of the present invention will now be described with reference to FIGS. 13A to 13C. The configuration in Example 2 is the same as that in Example 1 except that the arrangement of the conveyance passages 231 has been changed. Therefore, components similar to those in Example 1 will be given the same reference signs, and descriptions thereof will be omitted.

In Example 1, the four conveyance passages 231 connected to the cartridges P for the respective colors are arranged such that two conveyance passages 231 and two conveyance passages 231 are disposed at the first end LE and the second end RE, respectively, with the laser light path L interposed therebetween in the second direction Y. However, depending on the configuration of the image forming apparatus 1, the space outside the laser light path L in the second direction Y may be different between the first end and the second end.

Figures 13A, 13B, 13C:
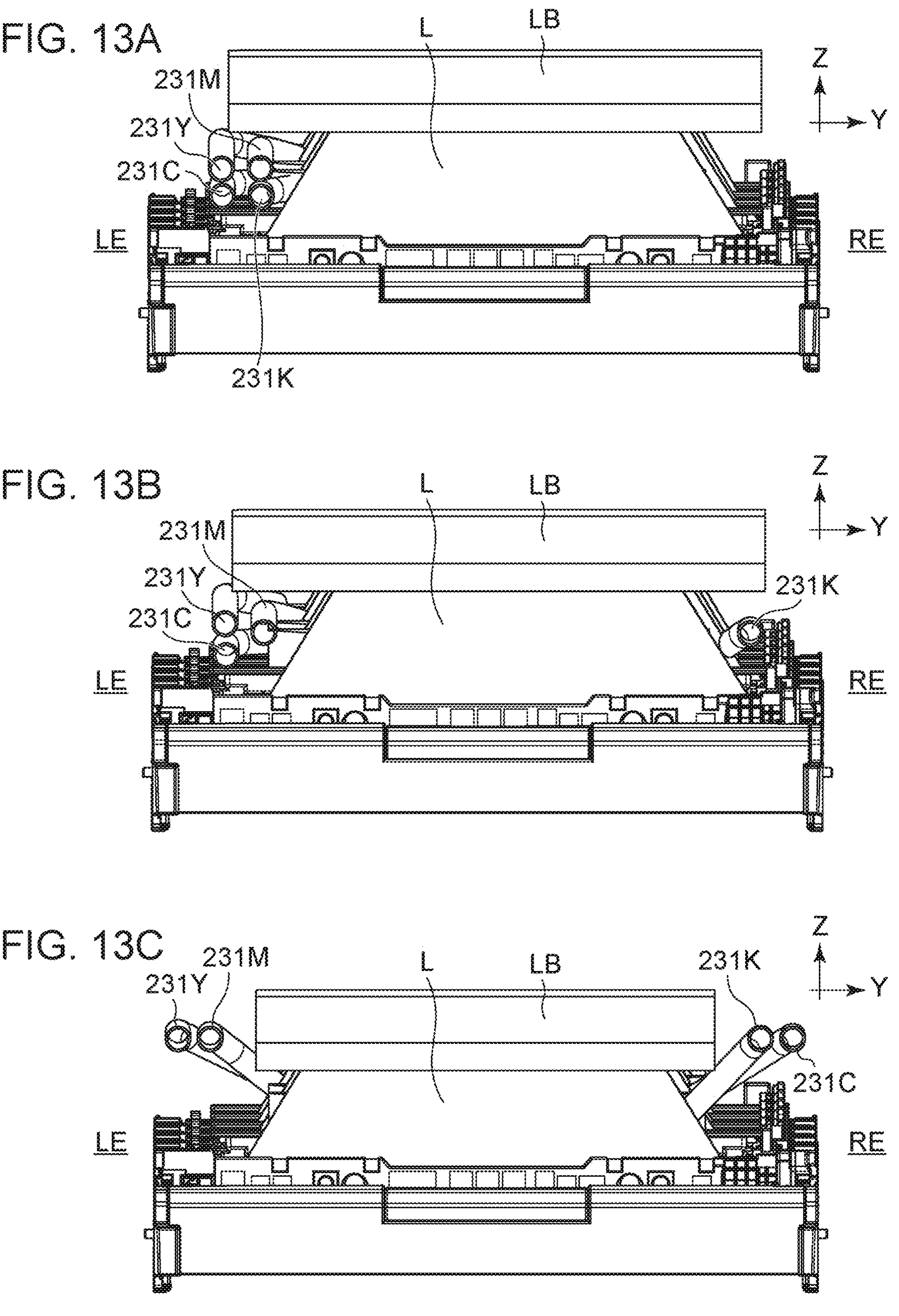
FIG. 13A is a cross-sectional view of the laser scanner unit, the toner conveyance passages, and the cartridges according to Example 2.
FIG. 13B is a cross-sectional view of the laser scanner unit, the toner conveyance passages, and the cartridges according to Example 2.
FIG. 13C is a cross-sectional view of the laser scanner unit, the toner conveyance passages, and the cartridges according to Example 2.

In FIG. 13A, four conveyance passages 231 and no conveyance passages 231 are disposed at the first end LE and the second end RE, respectively, with the laser light path L interposed therebetween. Specifically, the conveyance passages 231 (231Y, 231M, 231C, 231K) are disposed at the first end LE, but are not disposed at the second end RE. In the third direction Z, the conveyance passages 231 (231Y, 231M, 231C, 231K) are disposed between the laser scanner unit LB and the cartridges P (developing units 9).

In FIG. 13B, three conveyance passages 231 and one conveyance passage 231 are disposed at the first end LE and the second end RE, respectively, with the laser light path L interposed therebetween. Specifically, the conveyance passage 231Y, the conveyance passage 231M, and the conveyance passage 231C are disposed at the first end LE, and the conveyance passage 231K is disposed at the second end RE. In the third direction Z, the conveyance passages 231 (231Y, 231M, 231C, 231K) are disposed between the laser scanner unit LB and the cartridges P (developing units 9).

In FIG. 13C, two conveyance passages 231 and two conveyance passages 231 are disposed at the first end LE and the second end RE, respectively, with the laser light path L interposed therebetween, similar to Example 1. Specifically, the conveyance passage 231Y and the conveyance passage 231M are disposed at the first end LE, and the conveyance passage 231C and the conveyance passage 231K are disposed at the second end RE. The difference from Example 1 is that, when viewed in the second direction Y, each conveyance passage 231 (231Y, 231M, 231C, 231K) overlaps the laser scanner unit LB. This arrangement can be employed when the laser scanner unit LB used is of a compact type with a small width in the second direction Y.

When arranging the conveyance passages 231, space is effectively and appropriately utilized, so that the image forming apparatus 1 can be made compact.

Example 3

Example 3 according to the present invention will now be described with reference to FIGS. 14A to 14C. In Example 3, only the configuration of the cover 72*a* of the image forming apparatus 1 according to Example 1 has been changed. Therefore, components similar to those in Example 1 will be given the same reference signs, and descriptions thereof will be omitted.

The cover 72*a* according to Example 1 is a cover shared among the four mount sections 200. In this Example, four independent covers 372 (372*a*Y, 372*a*M, 372*a*C, 372*a*K) are provided at the mount sections 200 for the respective colors.

Figure 14A:
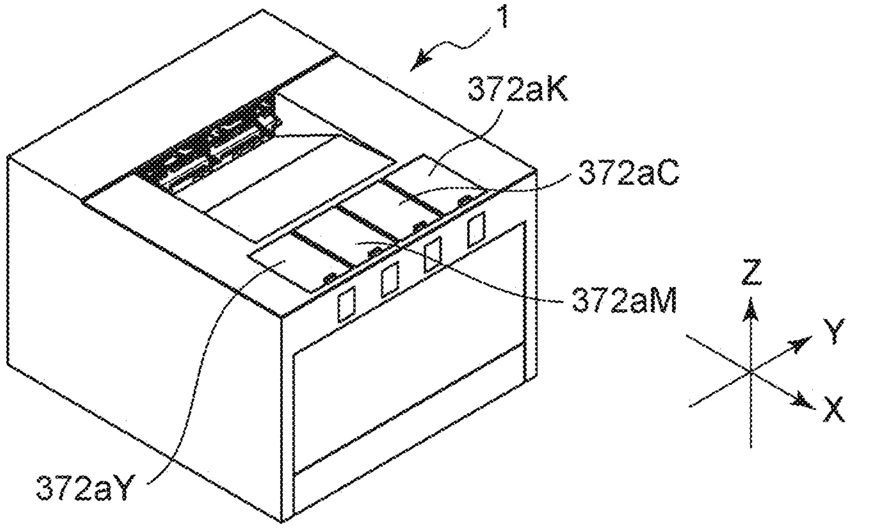
FIG. 14A is a perspective view of an image forming apparatus according to Example 3.

FIG. 14A is a perspective view of the image forming apparatus 1 in a state where the cover 372*a*Y is closed. FIG. 14B is a perspective view of the image forming apparatus 1 in a state where the cover 372*a*Y is open and the mount section 200Y is exposed to the outside. FIG. 14C is a perspective view of the image forming apparatus 1 in a state where the cover 372*a*Y is open and the resupply package 210Y is mounted to the mount section 200Y.

The cover 372*a*Y, the cover 372*a*M, the cover 372*a*C, and the cover 372*a*K will respectively be defined as a first cover, a second cover, a third cover, and a fourth cover. The cover 372*a*Y is rotatable about a rotational axis RA2 between a first closed position (FIG. 14A) for covering the mount section 200Y and a first open position (FIG. 14B) for exposing the mount section 200Y. The rotational axis RA2 extends in the second direction Y. When the cover 372*a*Y is open, an instruction section IS2 provided at the rear surface of the cover 372*a*Y is viewable, as shown in FIG. 14B. The function of the instruction section IS2 is the same as that of the instruction section IS1 in Example 1.

Figure 14B:
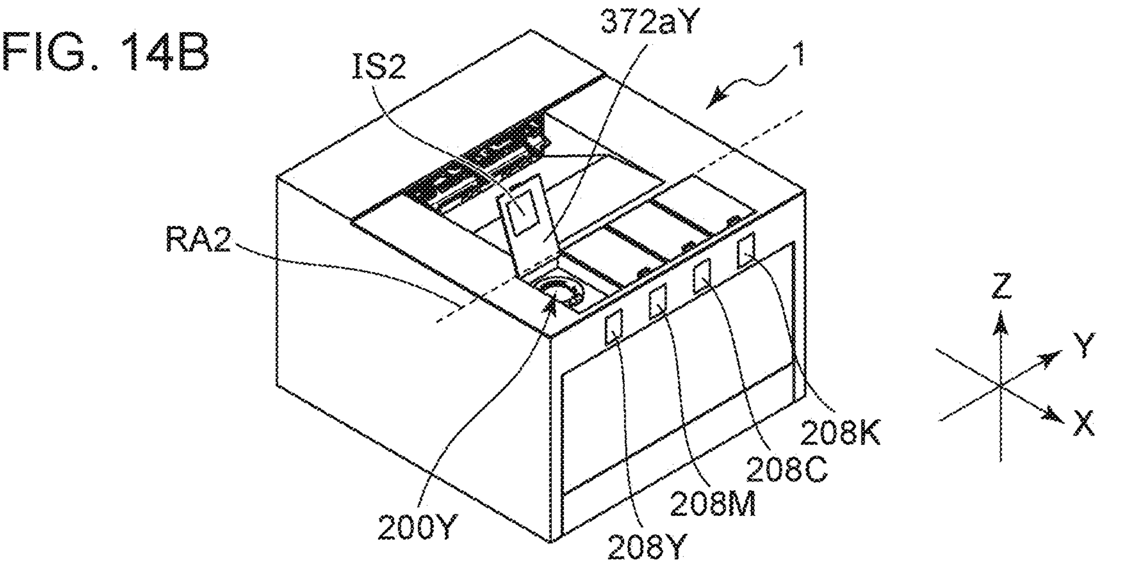
FIG. 14B is a perspective view of the image forming apparatus according to Example 3.
Figure 14C:
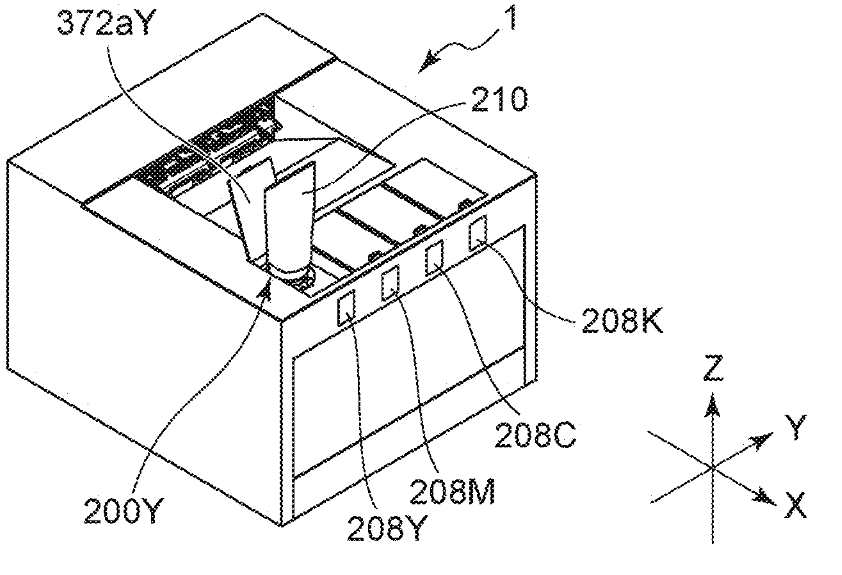
FIG. 14C is a perspective view of the image forming apparatus according to Example 3.

As shown in FIG. 14C, the mount section 200Y is configured such that the resupply package 210Y is mountable thereto when the cover 372*a*Y is in the first open position. When the resupply package 210Y is mounted to the mount section 200Y, the cover 372*a*Y is not movable to the first closed position since the cover 372*a*Y interferes with the resupply package 210Y. Likewise, the cover 372*a*M is movable (rotatable) between a second closed position for covering the mount section 200M and a second open position for exposing the mount section 200M. Similar to the mount section 200Y, the mount section 200M is configured such that the resupply package 210M is mountable thereto when the cover 372*a*M is in the second open position. When the resupply package 210M is mounted to the mount section 200M, the cover 372*a*M is not movable to the second closed position since the cover 372*a*M interferes with the resupply package 210M. The cover 372*a*C and the cover 372*a*K are also configured to move in a manner similar to the cover 372*a*Y.

With the configuration of the covers 372*a* according to this Example described above, when toner is to be resupplied for a single color alone, the user can perform an operation without exposing the other mount sections 200, as shown in FIGS. 14B and 14C.

When resupplying of the toners is not necessary, the covers 372*a* for the mount sections 200 are locked so as to be non-movable to the open position. When resupplying of the toners is possible, the covers 372*a* for the mount sections 200 are unlockable. This can prevent a situation where toner is resupplied as a result of a resupply package 210 being mounted to the mount section 200 for a color not in a toner resuppliable state.

Furthermore, as shown in FIG. 14B, the indicators 208 are provided near the mount sections 200, as in Example 1, and are configured to notify the user of each mount section 200 in a toner resuppliable state.

Figure 19A:
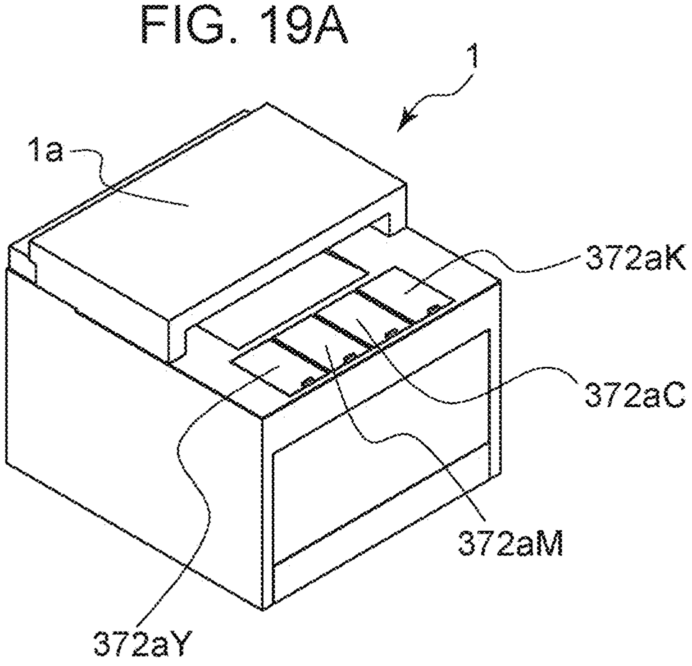
FIG. 19A is a perspective view of the image forming apparatus according to Example 3 to which an image reading unit is attached.
Figure 19B:
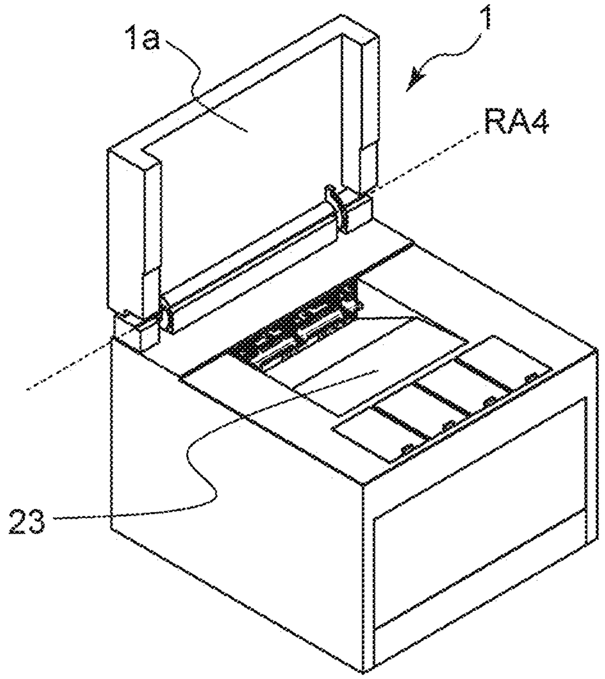
FIG. 19B is a perspective view of the image forming apparatus according to Example 3 to which the image reading unit is attached.
Figure 19C:
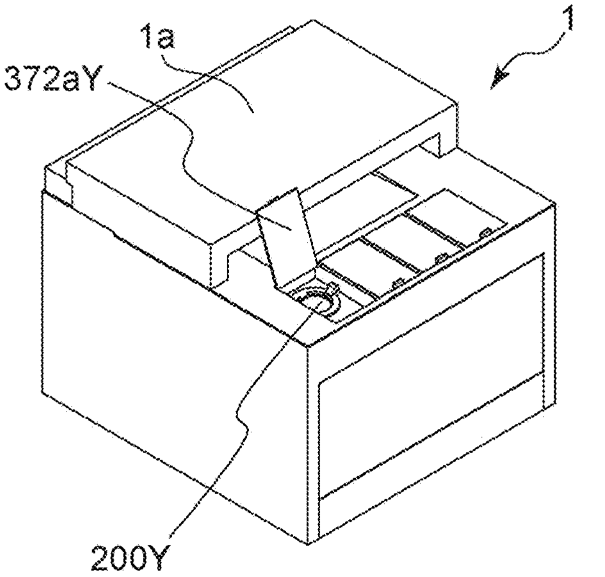
FIG. 19C is a perspective view of the image forming apparatus according to Example 3 to which the image reading unit is attached.
Figure 19D:
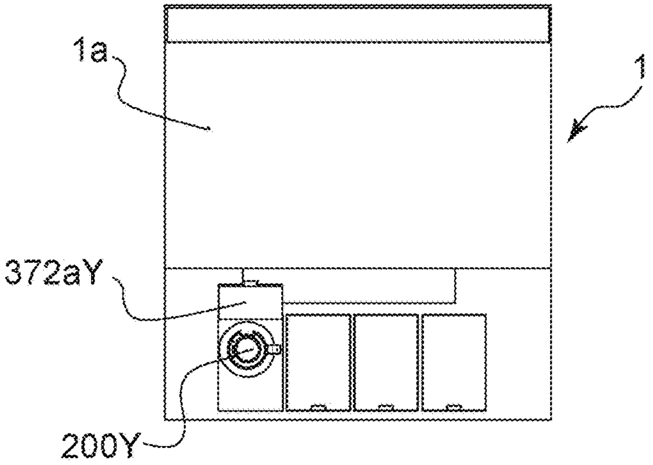
FIG. 19D is a perspective view of the image forming apparatus according to Example 3 to which the image reading unit is attached.
Figure 19E:
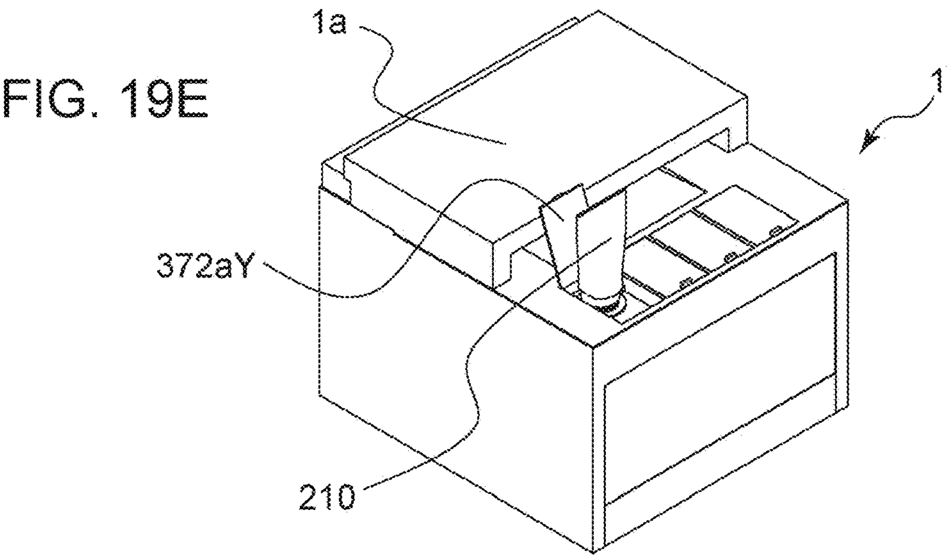
FIG. 19E is a perspective view of the image forming apparatus according to Example 3 to which the image reading unit is attached.

Next, the image forming apparatus 1 provided with an image reading unit 1*a* (image reader, read scanner) will be described with reference to FIGS. 19A to 19E. FIG. 19A is a perspective view of the image forming apparatus 1 in a state where the image reading unit 1*a* is closed. FIG. 19B is a perspective view of the image forming apparatus 1 in a state where the image reading unit 1*a* is open. FIG. 19C is a perspective view of the image forming apparatus 1 in a state where the image reading unit 1*a* is closed and the cover 372*a*Y is open. FIG. 19D is a top view of the image forming apparatus 1 in a state where the image reading unit 1*a* is closed and the cover 372*a*Y is open. FIG. 19E is a perspective view of the image forming apparatus 1 in a state where the image reading unit 1*a* is closed and a resupply package 210 is mounted to the mount section 200Y. The image reading unit 1*a* is attached to the upper side of the image forming apparatus 1. The image reading unit 1*a* is rotatable about a rotational axis RA4 (see FIG. 19B) between a closed position (see FIG. 19A) and an open position (FIG. 19B). This is to enhance accessibility to a recording medium S (particularly, a small-size recording medium S) discharged on the discharge tray 23.

As shown in FIG. 19C, the cover 372*a*Y can be opened even when the image reading unit 1*a* is in the closed position. As shown in FIG. 19D, the mount section 200Y is provided at a location where the upper side thereof is not covered by the image reading unit 1*a* even when the image reading unit 1*a* is in the closed position. In other words, when viewed from above in the third direction Z, the mount section 200Y is disposed so as not to overlap the image reading unit 1*a* in the closed position. Accordingly, as shown in FIG. 19E, the resupply package 210 can be mounted to the mount section 200Y even when the image reading unit 1*a* is in the closed position. The same applies to the cover 372*a*M, the cover 372*a*C, and the cover 372*a*K.

Figure 15A:
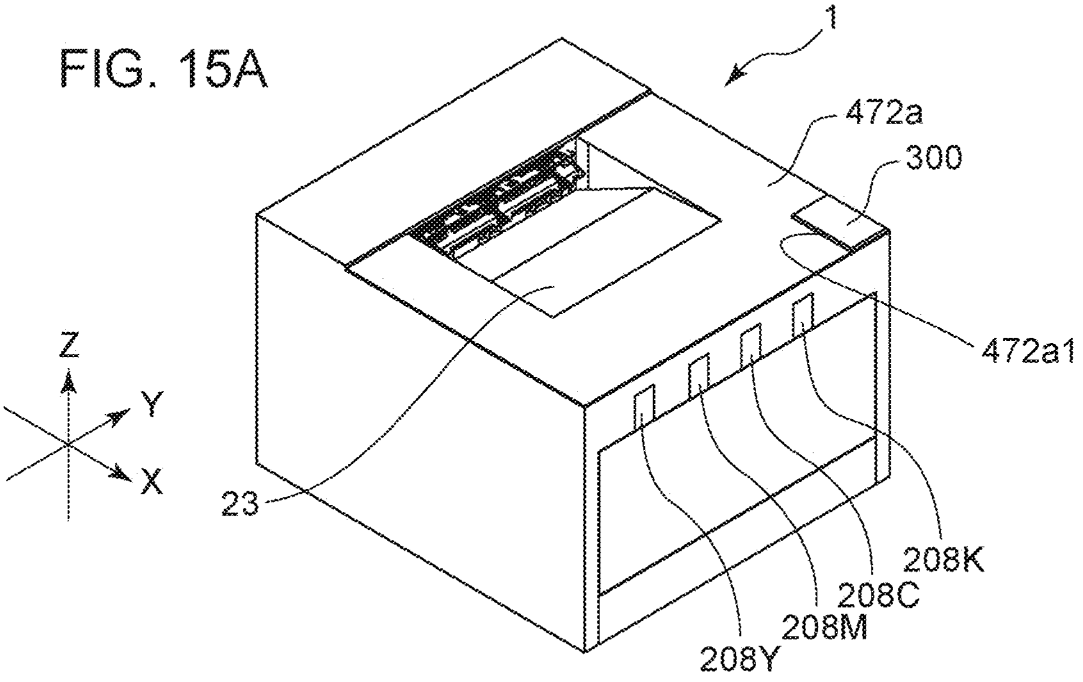
FIG. 15A is a perspective view of an image forming apparatus according to a modification of Example 3.
Figure 15B:
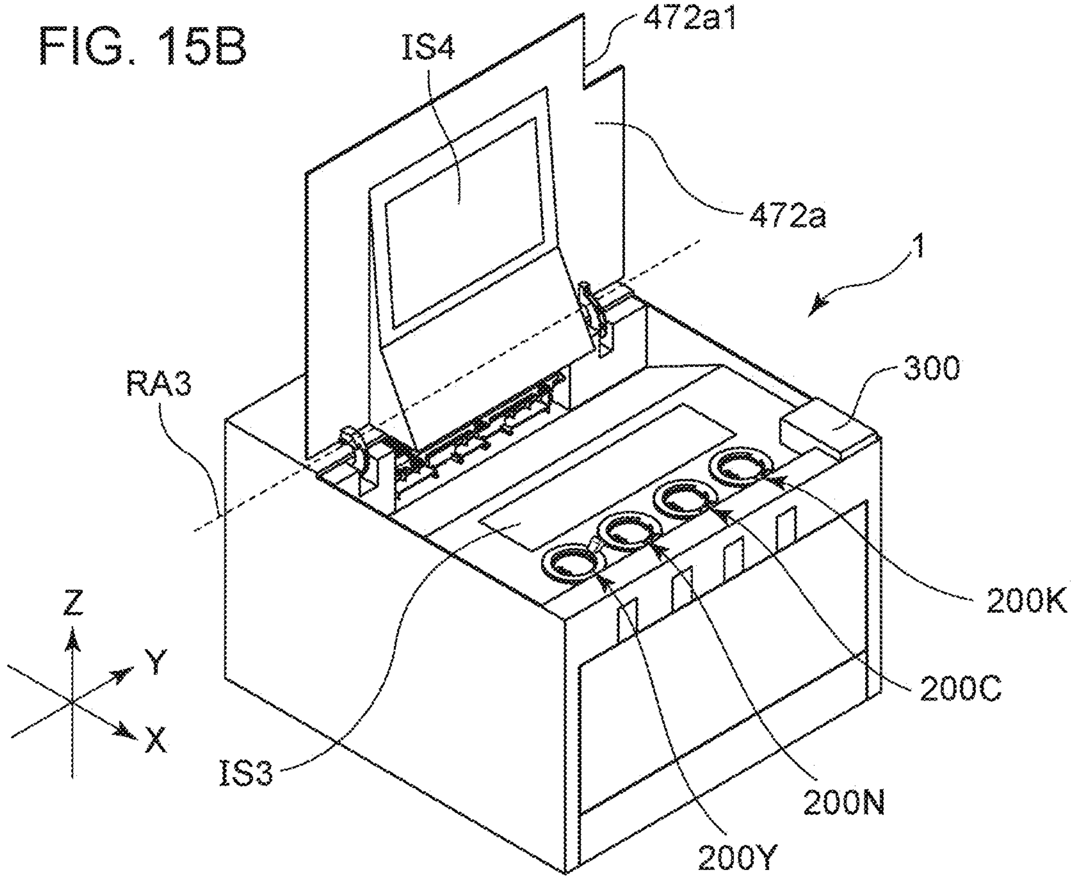
FIG. 15B is a perspective view of the image forming apparatus according to the modification of Example 3.

A modification of Example 3 is shown in FIGS. 15A and 15B. A cover 472*a* that rotates about a rotational axis RA3 extending in the second direction Y to cover the four mount sections 200 also serves as the discharge tray 23. The cover 472*a* and the discharge tray 23 are integrated, so that a boundary (step) between the cover and the discharge tray can be eliminated. Consequently, the recording medium S is discharged without getting caught on the discharge tray 23. The position of a hinge serving as the rotational axis RA3 of the cover 472*a* can be set distant from the mount sections 200, as compared with the configuration according to this Example. Accordingly, the space near the mount sections 200 can be increased, thereby facilitating the mounting of the resupply packages 210 to the mount sections 200 by the user. Moreover, on the surface provided with the mount sections 200, an area located toward the rear side of the image forming apparatus 1 relative to the mount sections 200 may be provided with an instruction section IS3. As shown in FIG. 15B, an instruction section IS4 provided on the rear surface of the cover 472*a* may be viewable when the cover 472*a* is open. The instruction sections IS3 and IS4 each have the same function as the instruction section IS1 in Example 1. Alternatively, only one of the instruction sections IS3 and IS4 may be provided.

Similar to Example 1, the indicators 208 are provided near the mount sections 200 for the respective colors, as shown in FIG. 15B, and are configured to notify the user of each mount section 200 in a toner resuppliable state. The indicators 208 may be disposed near the mount sections 200 for the respective colors and at the top surface of the apparatus body 72 so long as the mount sections corresponding to the toners to be resupplied are recognizable.

Furthermore, in a modification of Example 3, an operation section 300 is provided. The operation section 300 outputs a command for changing the print settings to the image forming apparatus 1 in response to an operation, and also functions as a display unit for displaying a message to the user. As shown in FIG. 15B, the operation section 300 is configured not to rotate together with the cover 472*a*, so that the user can use the operation section 300 even when the cover 472*a* is open. In detail, the cover 472*a* is provided with a recess 427*al* recessed to expose the operation section 300 when the cover 472*a* is closed. The recess 427*al* may be a hole.

Example 4

Figure 16A:
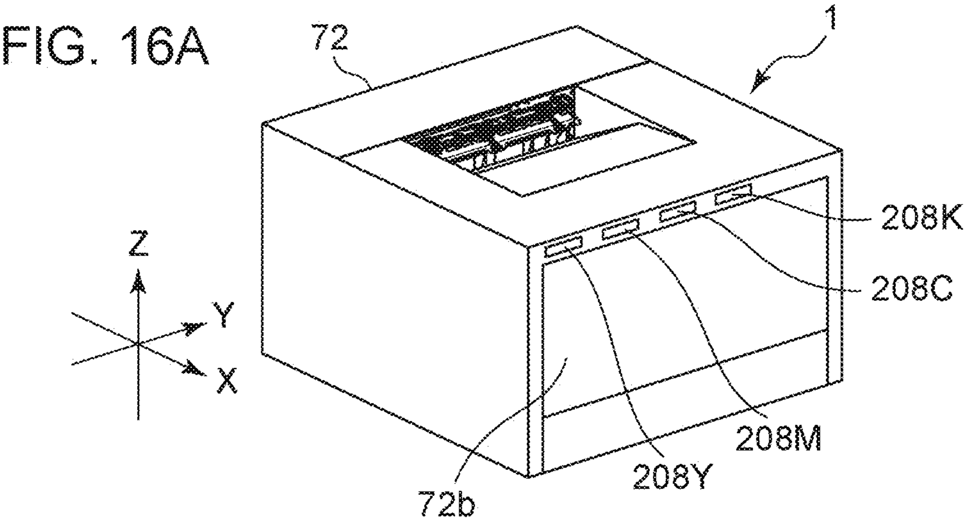
FIG. 16A is a perspective view of an image forming apparatus according to Example 4.
Figure 16B:
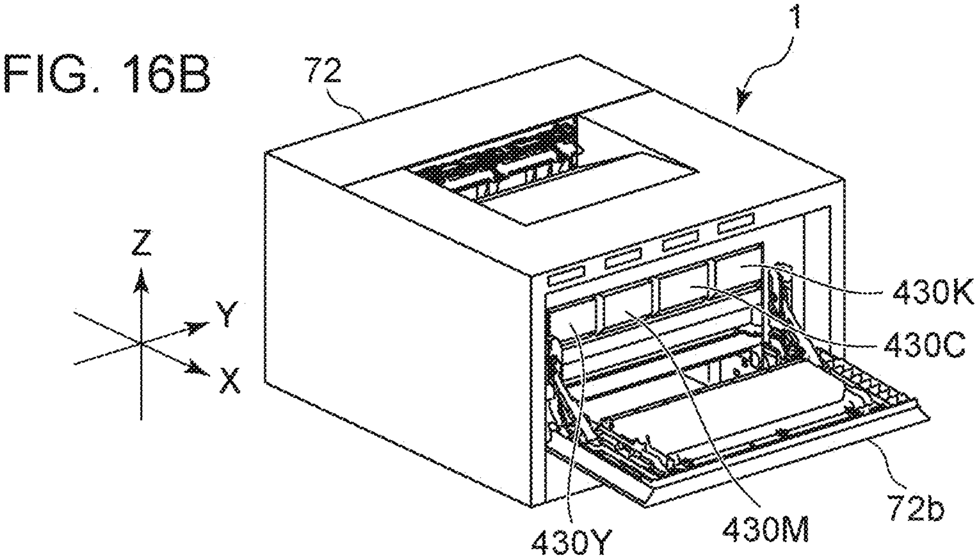
FIG. 16B is a perspective view of the image forming apparatus according to Example 4.
Figure 16C:
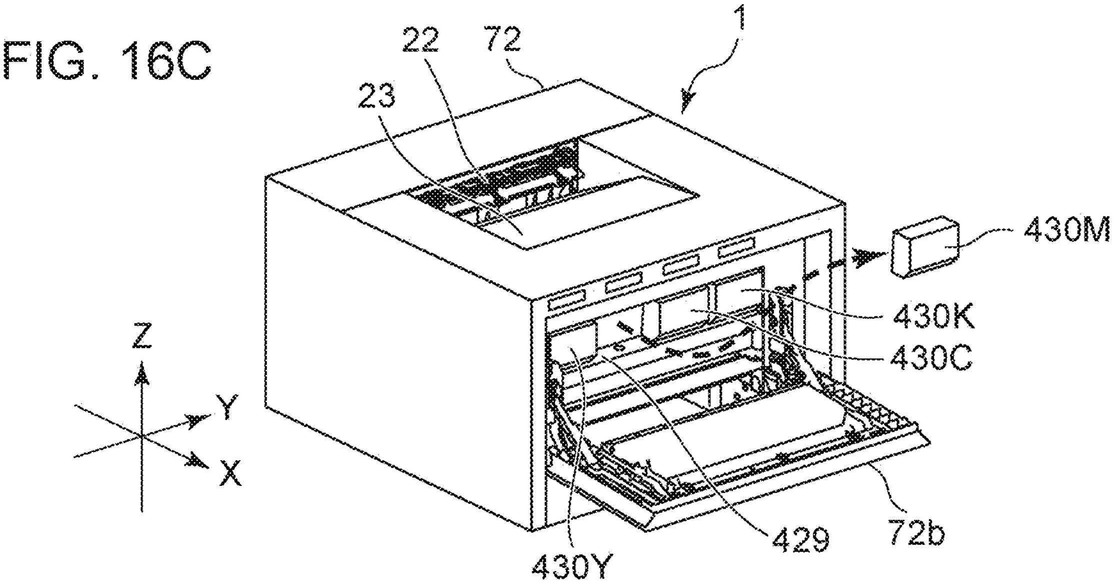
FIG. 16C is a perspective view of the image forming apparatus according to Example 4.

The configuration of Example 4 according to the present invention will now be described with reference to FIGS. 16A to 16C and FIGS. 17A and 17B. FIG. 16A is a perspective view of the image forming apparatus 1 in a state where the front door 72*b* is closed. FIG. 16B is a perspective view of the image forming apparatus 1 in a state where the front door 72*b* is open. FIG. 16C is a perspective view of the image forming apparatus 1 in a state where the front door 72*b* is open and a resupply cartridge 430M is dismounted from a cartridge holder 429M. The definitions of the front side and the rear side of the image forming apparatus according to this Example are the same as those in Example 1. The definitions of the first direction X, the second direction Y, and the third direction Z are also the same as those in Example 1.

Each of the resupply packages 210 in Example 1 to Example 3 is mounted to the corresponding mount section 200 in a state where at least a part (pouch 211) of the resupply package 210 is exposed outside the apparatus body 72 when the front door 72*b* is closed. In contrast, the image forming apparatus 1 according to Example 4 has resupply cartridges 430 (430Y, 430M, 430C, 430K) that are accommodated within the apparatus body 72 when the front door 72*b* is closed. Components similar to those in Example 1 will be given the same reference signs, and descriptions thereof will be omitted.

The resupply cartridges 430 are mounted to the upper side of the front surface of the apparatus body 72 such that the resupply cartridges 430 are accessible by opening the front door 72*b*. The front door 72*b* is configured to be movable between a closed position (FIG. 16A) for closing a front opening of the apparatus body 72 and an open position (FIG. 16B) for exposing the opening. When the front door 72*b* is moved to the open position, the resupply cartridges 430 are exposed to the outside of the image forming apparatus 1 through the opening, as shown in FIG. 16B. The four resupply cartridges 430 are arranged in the second direction Y and are detachable from the apparatus body 72 in the first direction X, as shown in FIG. 16C. Accordingly, toner can be resupplied to each cartridge P without having to detach the cartridge P from the apparatus body 72. With the resupply cartridges 430 being disposed at the front side of the image forming apparatus 1, the recording medium S discharged to the discharge tray 23 can be collected, and the resupply cartridges 430 can be similarly accessed from the front side. Because cartridge holders 429 are located at the front side of the image forming apparatus 1, the cartridges P are not exposed even after the resupply cartridges 430 have been dismounted (see FIG. 16C).

[Toner Resupply Path]

Figure 17A:
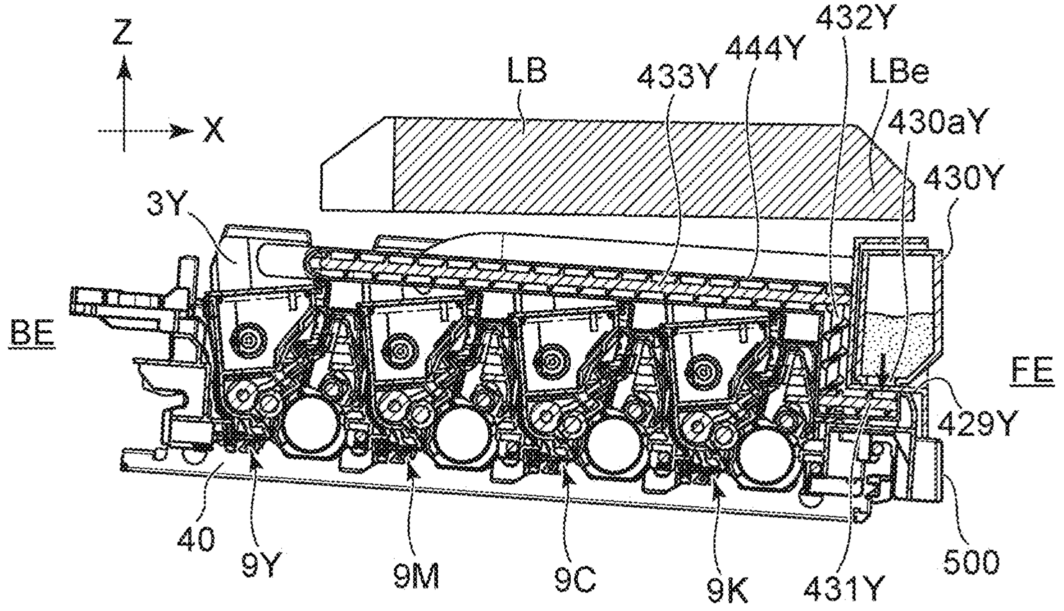
FIG. 17A is a cross-sectional view of the laser scanner unit and a drawer unit according to Example 4.
Figure 17B:
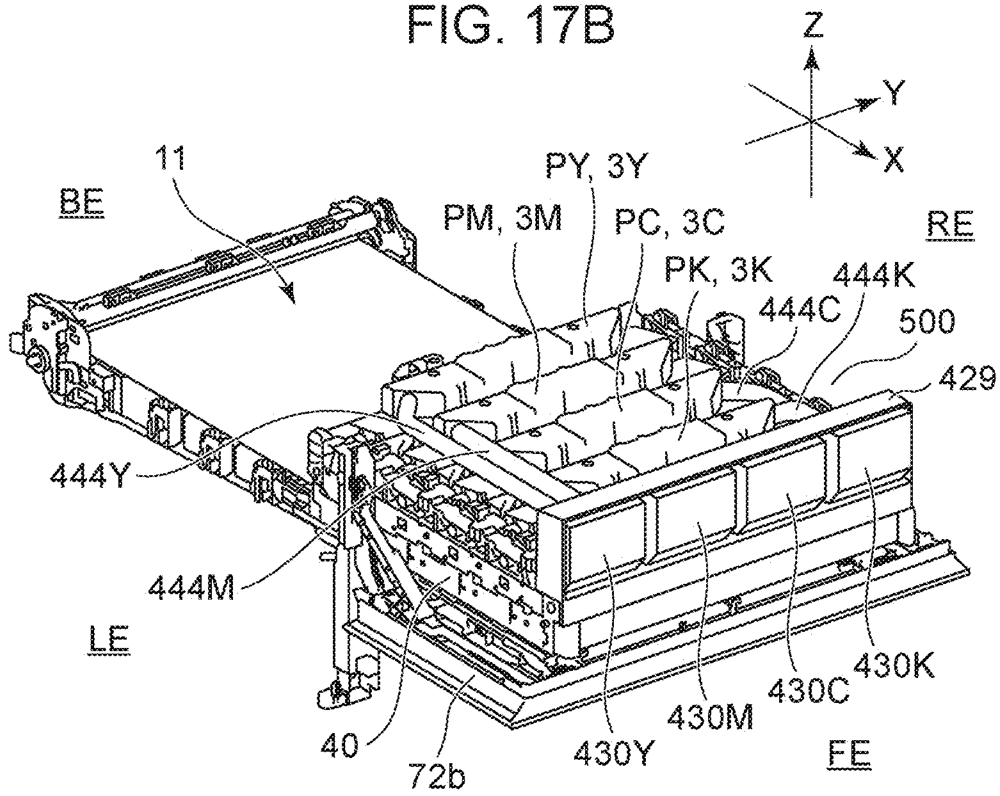
FIG. 17B is a perspective view of the laser scanner unit and the drawer unit according to Example 4.

A toner resupply path from each resupply cartridge 430 according to this Example to the corresponding cartridge P will now be described with reference to FIGS. 17A and 17B. A yellow-toner conveyance passage 444Y will be described. FIG. 17A is a cross-sectional view illustrating the conveyance passage 444Y from the corresponding resupply cartridge 430 to the cartridge PY. FIG. 17B is a perspective view of a drawer unit 500 when the drawer unit 500 is drawn outward.

In this Example, as shown in FIG. 17A, the resupply cartridge 430Y is mounted to a cartridge holder 429Y (mount section). The cartridge holder 429Y has an inverted-C shape in a cross section orthogonal to the second direction Y, and has a front opening for receiving the resupply cartridge 430Y.

As shown in FIG. 17A, the resupply cartridges 430 are provided toward a front surface FE relative to the cartridges P in the first direction X and below the laser scanner unit LB in the third direction Z. When viewed in the third direction Z, the resupply cartridge 430Y overlaps the end LBe (front end) serving as a part of the laser scanner unit LB. The resupply cartridge 430Y is disposed to overlap the corresponding cartridge P (developer container 3), as viewed in the first direction X. In this Example, the resupply cartridge 430Y overlaps the developer container 3Y, the developer container 3M, the developer container 3C, and the developer container 3K, as viewed in the first direction X. Accordingly, the image forming apparatus 1 can be reduced in width in the third direction Z and the first direction X, thereby contributing to size reduction of the image forming apparatus 1.

The bottom surface of the resupply cartridge 430Y is provided with an outlet 430*a*Y for discharging the toner from the resupply cartridge 430Y. The toner discharged downward due to its own weight from the outlet 430*a*Y of the resupply cartridge 430Y is conveyed to the cartridge PY (developer container 3Y) by a first screw 431Y, a second screw 432Y, and a third screw 433Y through the conveyance passage 444Y (first conveyance passage). The first screw 431Y, the second screw 432Y, and the third screw 433Y are driven in response to a driving force received from a driving source (not shown) of the apparatus body 72. The first screw 431Y extends from the front surface FE toward the rear surface BE in the first direction X. The second screw 432Y extends upward in the third direction Z. The third screw 433Y extends from the front surface FE toward the rear surface BE in the first direction X. The conveyance passage of the toner conveyed toward the cartridge PY after being conveyed by the third screw 433Y is similar to that in Example 1, and the description thereof will thus be omitted.

A conveyance passage 444M (second conveyance passage), a conveyance passage 444C (third conveyance passage), and a conveyance passage 444K (fourth conveyance passage) shown in FIG. 17B will now be described. The conveyance passage 444M extends from the resupply cartridge 430M to the cartridge PM (developer container 3M). The conveyance passage 444C extends from the resupply cartridge 430C to the cartridge PC (developer container 3C). The conveyance passage 444K extends from the resupply cartridge 430K to the cartridge PK (developer container 3K). The arrangement of the four conveyance passages 444 in a cross section orthogonal to the first direction X is similar to that in FIGS. 12A, 12B, and 13A to 13C in Example 1, and the description thereof will thus be omitted.

The conveyance passage 444M, the conveyance passage 444C, and the conveyance passage 444K are provided with screws serving as second conveying means, third conveying means, and fourth conveying means, respectively. Similar to Example 1, pump-based air conveyance or belt conveyance may be used as the conveying means in each conveyance passage 444.

The resupply cartridge 430Y has a shutter (not shown) configured to close the outlet 430*a*Y when the resupply cartridge 430Y is dismounted from the apparatus body 72.

According to the configuration of this Example described above, toner can be resupplied to each cartridge P by using the corresponding resupply cartridge, detachable from the apparatus body of the image forming apparatus, without having to detach the cartridge P from the image forming apparatus.

Example 5

Figure 18A:
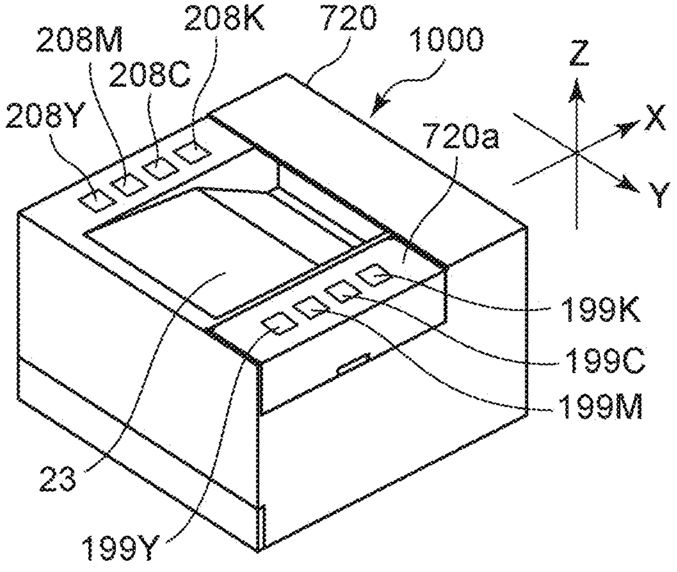
FIG. 18A is a perspective view of an image forming apparatus and cartridges according to Example 5.
Figure 18B:
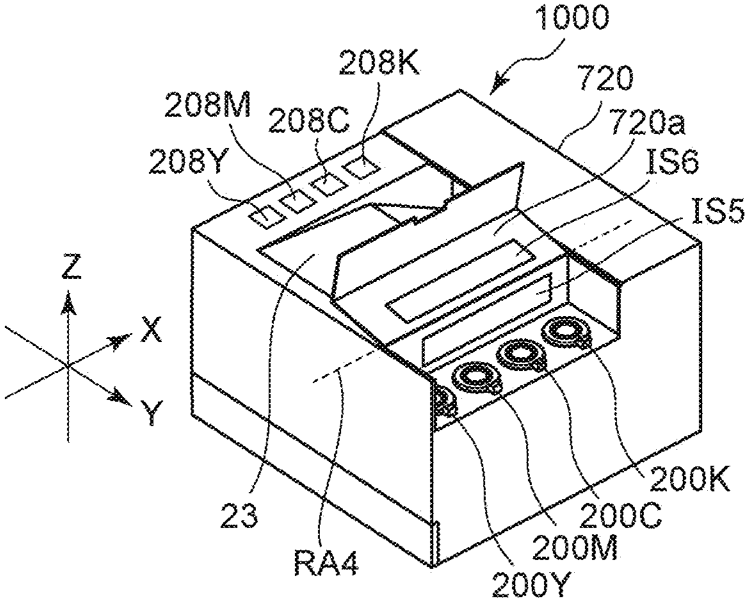
FIG. 18B is a perspective view of the image forming apparatus and the cartridges according to Example 5.
Figure 18C:
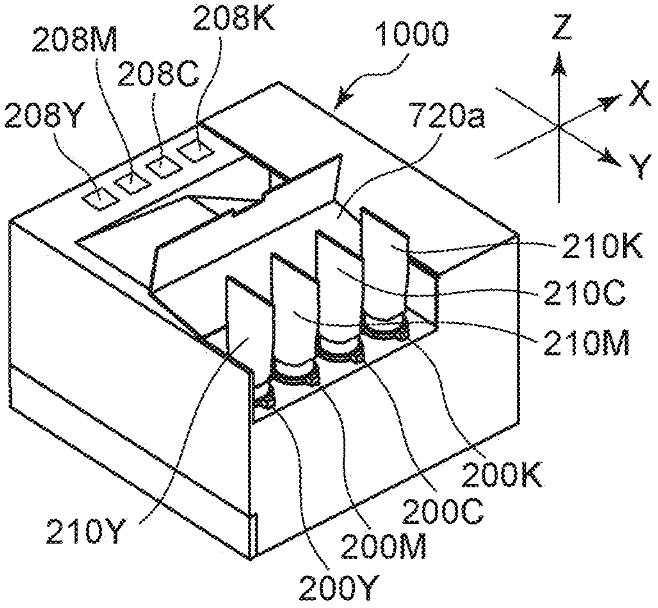
FIG. 18C is a perspective view of the image forming apparatus and the cartridges according to Example 5.

The configuration of Example 5 will now be described with reference to FIGS. 18A to 18D. Components similar to those in Example 1 to Example 4 will be given the same reference signs, and descriptions thereof will be omitted. FIGS. 18A, 18B, and 18C are perspective views of an image forming apparatus 1000 according to this Example. FIG.

18D is a perspective view illustrating process cartridges P (referred to as "cartridges P" hereinafter) included in the image forming apparatus 1000.

The mount sections 200 (200Y, 200M, 200C, 200K) are arranged in the first direction X at the front right end (i.e., an end in the second direction Y) of the image forming apparatus 1 (apparatus body 720).

As shown in FIG. 18B, the image forming apparatus 1000 has a cover 720*a* that covers the mount sections 200. The cover 720*a* rotates about the rotational axis RA4 extending in the first direction X between a closed position for covering the mount sections 200 and an open position for exposing the mount sections 200. Because the cover 720*a* is configured to open by rotating toward the discharge tray 23, an unnecessary space for opening the cover 720*a* does not need to be provided at the outer side of the image forming apparatus 1. In other words, the space occupied by the image forming apparatus 1000 can be reduced. As shown in FIG. 18C, four resupply packages 210 can be simultaneously mounted to the mount sections 200.

In a state where the cover 720*a* is open, a wall surface extending in the first direction X and the third direction Z at the discharge tray 23 side of the mount sections 200 is provided with an instruction section IS5. Furthermore, in the state where the cover 720*a* is open, an instruction section IS6 provided at the rear surface of the cover 720*a* is viewable. The instruction sections IS5 and IS6 each have the same function as the instruction section IS1 in Example 1.

The top surface of the image forming apparatus 1000 is provided with the indicators 208 (208Y, 208M, 208C, 208K). The indicators 208 are arranged in the first direction X in the order corresponding to the order of colors of the mount sections 200. Each indicator 208 may be constituted of an LED or sticker with the corresponding color, or may be configured to notify the user of each mount section 200 in a toner resuppliable state. As shown in FIG. 18A, indicators 199 (199Y, 199M, 199C, 199K) may be disposed at the top surface of the cover 720*a* in a closed state. With regard to the indicators 208 and 199, either of the two types may be provided.

Figure 18D:
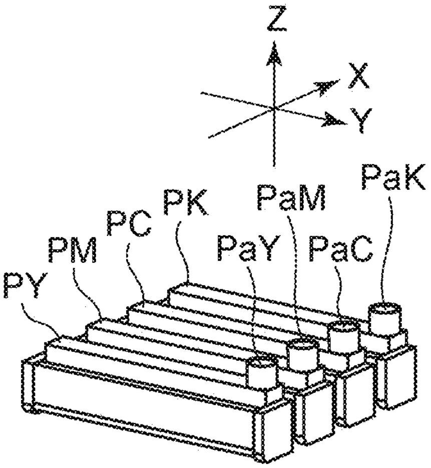
FIG. 18D is a perspective view of the image forming apparatus and the cartridges according to Example 5.

As shown in FIG. 18D, four cartridges P (PY, PM, PC, PK) for yellow, magenta, cyan, and black colors are provided in the image forming apparatus 1000. The longitudinal direction of the cartridges P for the four colors is the second direction Y, and the cartridges P are arranged in the first direction X. The cartridges P are provided with protrusions Pe (PeY, PeM, PeC, PeK) that respectively communicate with the mount sections 200 (200Y, 200M, 200C, 200K). The toner in each resupply package 210 is resupplied to a toner receptacle of the corresponding cartridge P via the corresponding protrusion Pe.

According to the configuration of this Example described above, toner can be resupplied to each cartridge P by using the corresponding resupply package, mounted to the corresponding mount section of the image forming apparatus, without having to detach the cartridge from the image forming apparatus.

According to the present invention, an embodiment of an image forming apparatus can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image forming apparatus for forming an image onto a recording medium, the image forming apparatus comprising:

a first developing unit having a first developer accommodating portion and a first developing roller, the first developer accommodating portion being configured to accommodate a first developer, the first developing roller being configured to carry the first developer;

a second developing unit provided to align with the first developing unit in a first direction intersecting a gravity direction and having a second developer accommodating portion and a second developing roller, the second developer accommodating portion being configured to accommodate a second developer, the second developing roller being configured to carry the second developer;

an apparatus body including a discharge roller configured to discharge the recording medium to an outside of the image forming apparatus in a discharge direction along the first direction;

a first developer container accommodating the first developer, the first developer container being detachably attached to the apparatus body; and a second developer container accommodating the second developer, the second developer container being aligned with the first developer container in a second direction intersecting with both the first direction and the gravity direction, the second developer container being detachably attached to the apparatus body, wherein in a case where one end and the other end of the apparatus body in the second direction are defined as a first end and a second end, respectively, and a downstream end of the apparatus body in the discharge direction is defined as a front end of the apparatus body, the apparatus body includes a first conveyance passage through which the first developer is conveyed from the first developer container towards the first developer accommodating portion, the first conveyance passage including a first portion provided on a side of the first end of the apparatus body in the second direction; and a second conveyance passage through which the second developer is conveyed from the second developer container towards the second developer accommodating portion, the second conveyance passage including a second portion provided on the side of the first end of the apparatus body in the second direction, wherein the first developer container and the second developer container are provided on a side of the front end of the apparatus body in the first direction, and wherein the first portion of the first conveyance passage and the second portion of the second conveyance passage are overlapped with each other when viewed in the gravity direction.

2. The image forming apparatus according to claim 1, further comprising:

a first photosensitive drum configured to be supplied with the first developer from the first developing roller;

a second photosensitive drum configured to be supplied with the second developer from the second developing roller; and an exposure unit configured to expose the first photosensitive drum and the second photosensitive drum to form a first electrostatic latent image and a second electrostatic latent image on the first photosensitive drum and the second photosensitive drum, respectively.

3. The image forming apparatus according to claim 2, wherein at least a part of the first developer container overlaps a part of the exposure unit as viewed in the gravity direction.

4. The image forming apparatus according to claim 2,
wherein the first conveyance passage and the second conveyance passage are provided to overlap the exposure unit when viewed in the gravity direction.

5. The image forming apparatus according to claim 1,
wherein the apparatus body includes a first conveyance member configured to rotate to convey the first developer in the first conveyance passage, and a second conveyance member configured to rotate to further convey the first developer conveyed by the first conveyance member in the first conveyance passage, and
wherein a direction of a rotation axis of the first conveyance member intersects a direction of a rotation axis of the second conveyance member.

6. The image forming apparatus according to claim 1, wherein the first developer container and the second developer container are each configured to be attachable and detachable in the first direction with respect to the apparatus body.

7. The image forming apparatus according to claim 1,
wherein at least part of the first developer container is positioned above the first developing unit,
at least part of the second developer container is positioned above the second developing unit, and
wherein in a case where a third direction is defined as a direction intersecting both the first direction and the second direction, the first conveyance passage includes a portion extending in the third direction, and the second conveyance passage includes a portion extending in the third direction.

8. The image forming apparatus according to claim 7,
wherein the portion of the first conveyance passage extending in the third direction overlaps with the first developer container when viewed in the first direction, and
wherein the portion of the second conveyance passage extending in the third direction overlaps with the second developer container when viewed in the first direction.

9. The image forming apparatus according to claim 1,
wherein the apparatus body includes a first holder and a second holder that are configured to accommodate the first developer container and the second developer container, respectively, and
wherein each of the first holder and the second holder has a U-shaped structure with an opening provided on the side of the front end of the apparatus body in a cross-section perpendicular to the second direction.

10. An image forming apparatus for forming an image onto a recording medium, comprising:
(i) a plurality of developing units that are aligned in a first direction intersecting with a gravity direction, the plurality of developing units including
(i-i) a first developing unit having a first developer accommodating portion configured to accommodate a first developer and a first developing roller configured to carry the first developer;
(i-ii) a second developing unit having a second developer accommodating portion configured to accommodate a second developer and a second developing roller configured to carry the second developer; and
(i-iii) a third developing unit having a third developer accommodating portion configured to accommodate a third developer and a third developing roller configured to carry the third developer,
(ii) an apparatus body including a discharge roller configured to discharge the recording medium to an outside of the image forming apparatus in a discharge direction along the first direction; and
(iii) a plurality of developer containers that are aligned in a second direction intersecting both the first direction and the gravity direction and that are independently attachable and detachable with respect to the apparatus body, the plurality of developer containers including:
(iii-i) a first developer container configured to accommodate the first developer;
(iii-ii) a second developer container configured to accommodate the second developer; and
(iii-iii) a third developer container configured to accommodate the third developer,
wherein in a case where one end and the other end of the apparatus body in the second direction are defined as a first end and a second end, respectively, and a downstream end of the apparatus body in the discharge direction is defined as a front end, the apparatus body includes:
a first conveyance passage through which the first developer is conveyed from the first developer container towards the first developer accommodating portion, the first conveyance passage including a first portion provided on a side of the first end of the apparatus body in the second direction;
a second conveyance passage through which the second developer is conveyed from the second developer container towards the second developer accommodating portion, the second conveyance passage including a second portion provided on the side of the first end of the apparatus body in the second direction; and
a third conveyance passage through which the third developer is conveyed from the third developer container towards the third developer accommodating portion, the third conveyance passage including a third portion provided on the side of the first end of the apparatus body in the second direction,
wherein the first developer container is positioned the closest to the first end of the apparatus body among the plurality of developer containers in the second direction,
wherein the first developer container, the second developer container, and the third developer container are aligned in this order in a direction from the first end to the second end with respect to the second direction, the first developer container and the second developer container are adjacent to each other, and the second developer container and the third developer container are adjacent to each other,
wherein the first developer container, the second developer container, and the third developer container are provided on a side of the front end of the apparatus body in the first direction, and
wherein the first portion of the first conveyance passage overlaps with the third portion of the third conveyance passage when viewed in the gravity direction.

11. The image forming apparatus according to claim 10, wherein the first portion of the first conveyance passage is positioned above the third portion of the third conveyance passage.

12. The image forming apparatus according to claim 10, wherein the plurality of developing units further includes a fourth developing unit, wherein the fourth developing unit includes a fourth developer accommodating portion configured to accommodate a fourth developer and a fourth developing roller configured to carry the fourth developer, and the fourth developing unit is aligned with the third developing unit in the first direction, wherein the plurality of developer containers further includes a fourth developer container, wherein the fourth developer container is configured to accommodate the fourth developer, and is aligned with the third developer container in the second direction on a side of the second end with respect to the third developer container in the second direction, wherein the apparatus body further includes a fourth conveyance passage through which the fourth developer is conveyed from the fourth developer container to the fourth developer accommodating portion, and wherein the fourth conveyance passage includes a fourth portion provided on the side of the first end of the apparatus body in the second direction.

13. The image forming apparatus according to claim 12, wherein the apparatus body includes a first conveyance member configured to rotate to convey the first developer in the first conveyance passage, and a second conveyance member configured to rotate to further convey the first developer conveyed by the first conveyance member in the first conveyance passage, and wherein a direction of a rotation axis of the first conveyance member intersects a direction of a rotation axis of the second conveyance member.

14. The image forming apparatus according to claim 10, wherein the first developer container, the second developer container, and the third developer container are each configured to be attachable and detachable in the first direction with respect to the apparatus body.

15. The image forming apparatus according to claim 10, wherein at least part of the first developer container is positioned above the first developing unit, at least part of the second developer container is positioned above the second developing unit, and at least part of the third developer container is positioned above the third developing unit, and wherein in a case where a third direction is defined as a direction intersecting both the first direction and the second direction, the first conveyance passage includes a portion extending in the third direction, the second conveyance passage includes a portion extending in the third direction, and the third conveyance passage includes a portion extending in the third direction.

16. The image forming apparatus according to claim 15, wherein the portion of the first conveyance passage extending in the third direction overlaps with the first developer container when viewed in the first direction, wherein the portion of the second conveyance passage extending in the third direction overlaps with the second developer container when viewed in the first direction, and wherein the portion of the third conveyance passage extending in the third direction overlaps with the third developer container when viewed in the first direction.

17. The image forming apparatus according to claim 14, wherein the apparatus body includes a first holder, a second holder, and a third holder configured to accommodate the first developer container, the second developer container, and the third developer container, respectively, and wherein each of the first holder, the second holder, and the third holder has a U-shaped structure with an opening provided on the side of the front end in a cross-section perpendicular to the second direction.

* * * * *